US011430985B2

(12) United States Patent
Hoshina et al.

(10) Patent No.: US 11,430,985 B2
(45) Date of Patent: Aug. 30, 2022

(54) ELECTRODE, SECONDARY BATTERY, BATTERY PACK, AND VEHICLE

(71) Applicant: KABUSHIKI KAISHA TOSHIBA, Minato-ku (JP)

(72) Inventors: Keigo Hoshina, Yokohama (JP); Kazuomi Yoshima, Yokohama (JP); Tomoko Sugizaki, Kawasaki (JP); Tomoe Kusama, Tokyo (JP); Tetsuya Sasakawa, Yokohama (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 119 days.

(21) Appl. No.: 16/566,308

(22) Filed: Sep. 10, 2019

(65) Prior Publication Data

US 2020/0303730 A1 Sep. 24, 2020

(30) Foreign Application Priority Data

Mar. 20, 2019 (JP) ............................. JP2019-052082
Sep. 5, 2019 (JP) ............................. JP2019-161875

(51) Int. Cl.
*H01M 4/36* (2006.01)
*H01M 4/485* (2010.01)
(Continued)

(52) U.S. Cl.
CPC ........... *H01M 4/366* (2013.01); *H01M 4/485* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

2012/0115028 A1* 5/2012 Ueno ................ H01M 10/0525 429/209
2014/0193695 A1* 7/2014 Hoshina ................ H01M 4/485 429/156
(Continued)

FOREIGN PATENT DOCUMENTS

JP 11-283664 10/1999
JP 2015-216101 A 12/2015
(Continued)

OTHER PUBLICATIONS

J.M.K.C. Donev et al. (2018). Energy Education—Regenerative braking (Year: 2018).*

*Primary Examiner* — Maria Laios
*Assistant Examiner* — Bartholomew A Hornsby
(74) *Attorney, Agent, or Firm* — Oblon, McClelland, Maier & Neustadt, L.L.P.

(57) ABSTRACT

According to one embodiment, an electrode is provided. A length of a first active material portion along a first direction is within a range of 0.7T or more and 0.95T or less with respect to a thickness T of an active material-containing layer. The first direction is parallel to a thickness direction. A second active material portion further contains solid electrolyte particles. A ratio E1/E2 is 0 or more and 0.01 or less. The ratio E1/E2 represents a ratio of a content E1 of the solid electrolyte particles per unit area in the first active material portion (including 0) to a content E2 of the solid electrolyte particles per unit area in the second active material portion.

20 Claims, 7 Drawing Sheets

(51) Int. Cl.
*H01M 4/525* (2010.01)
*H01M 4/505* (2010.01)
*H01M 10/0562* (2010.01)
*B60L 50/64* (2019.01)

(52) U.S. Cl.
CPC ......... *H01M 10/0562* (2013.01); *B60L 50/64* (2019.02); *B60Y 2200/91* (2013.01); *B60Y 2400/112* (2013.01); *H01M 2220/20* (2013.01); *H01M 2300/0071* (2013.01)

(56) References Cited

U.S. PATENT DOCUMENTS

| | | | | |
|---|---|---|---|---|
| 2015/0325854 | A1 | 11/2015 | Kim et al. | |
| 2015/0340741 | A1* | 11/2015 | Kim ........................ | H01M 4/13 29/623.1 |
| 2017/0358825 | A1 | 12/2017 | Yoshima et al. | |
| 2018/0083269 | A1 | 3/2018 | Iwasaki et al. | |
| 2018/0287145 | A1* | 10/2018 | Lee ....................... | H01M 4/133 |

FOREIGN PATENT DOCUMENTS

| | | | |
|---|---|---|---|
| JP | 2018-49705 | A | 3/2018 |
| JP | 2018-163870 | A | 10/2018 |
| WO | WO 2017/046915 | A1 | 3/2017 |

* cited by examiner

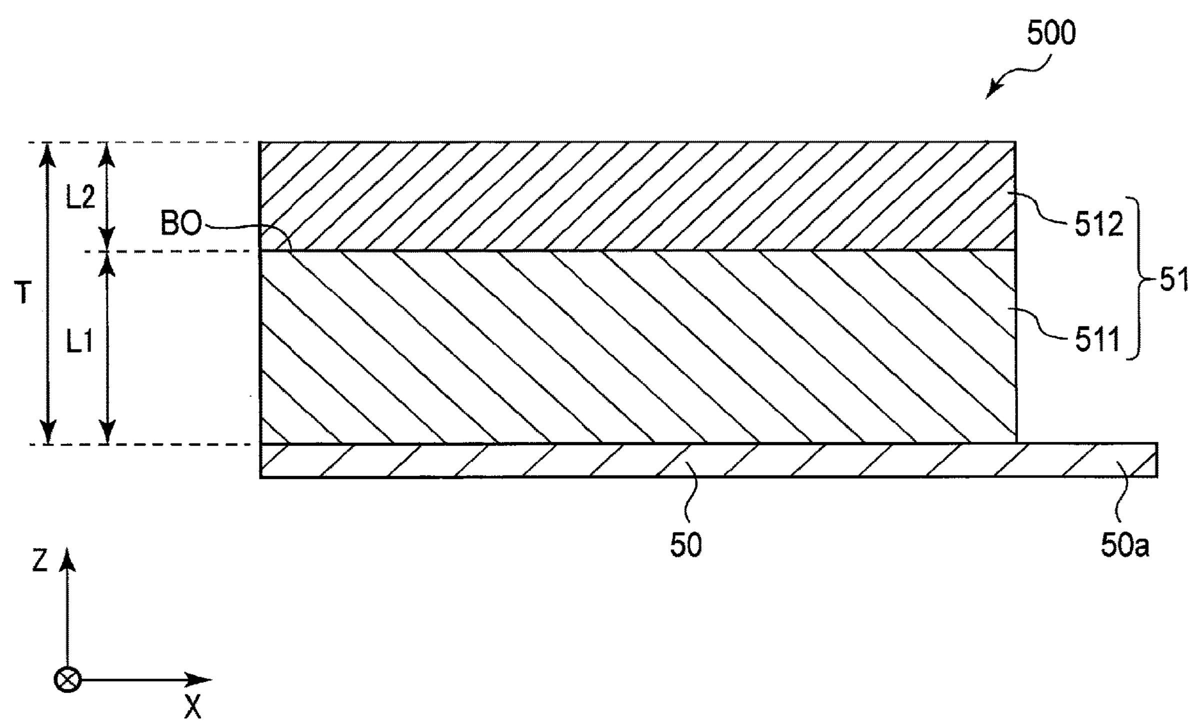
F I G. 1

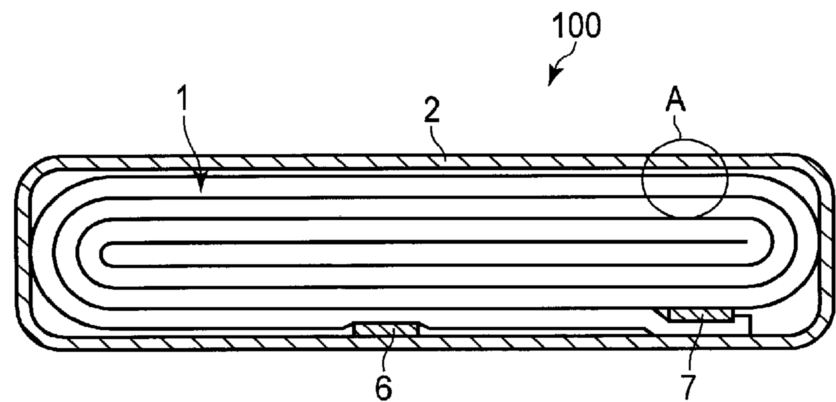
F I G. 2
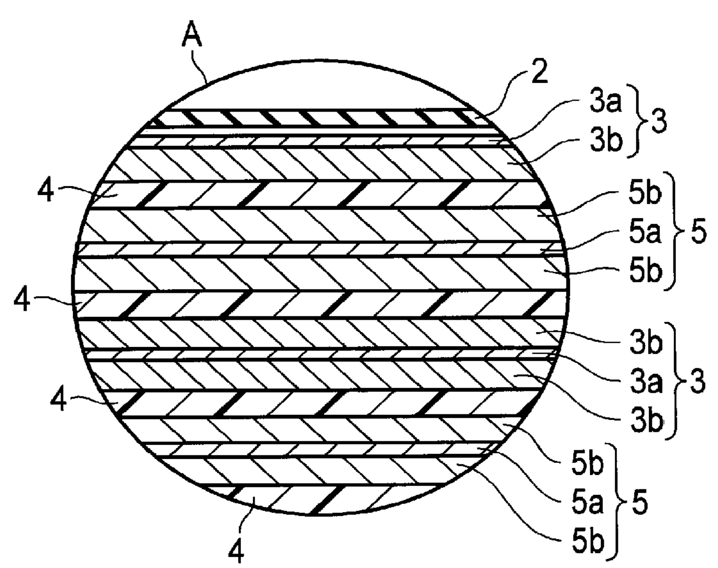
F I G. 3

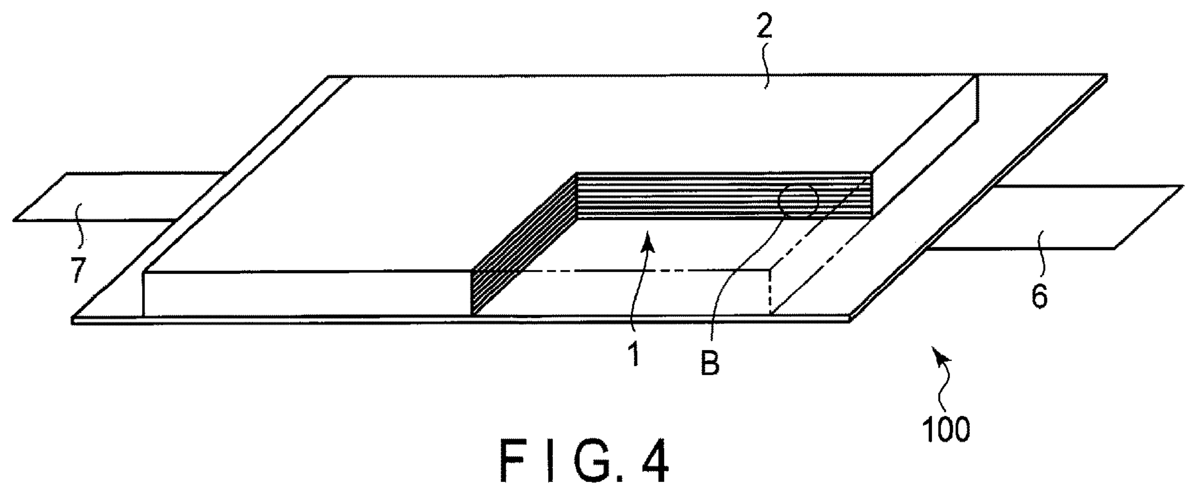
F I G. 4
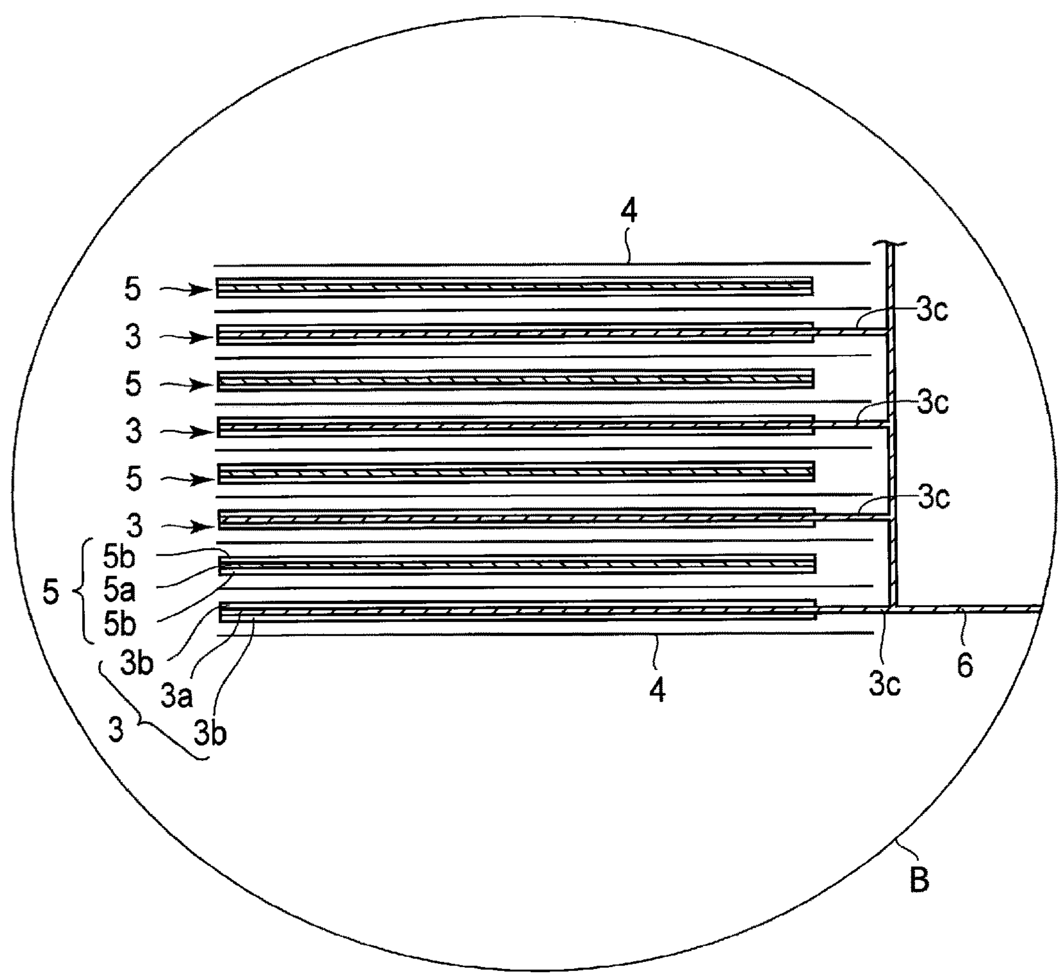
F I G. 5

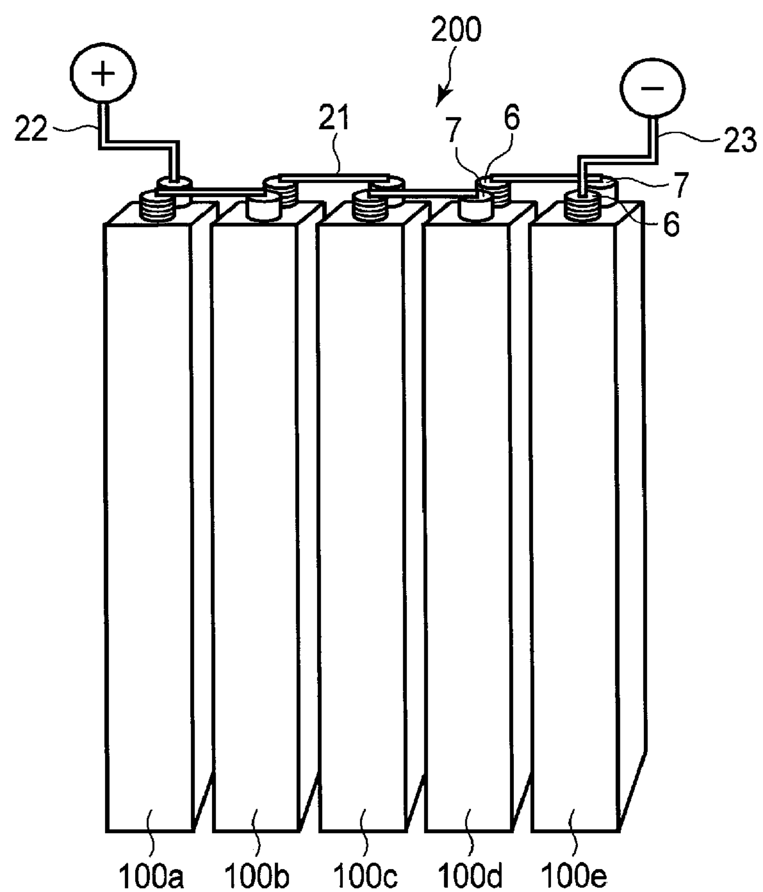
F I G. 6

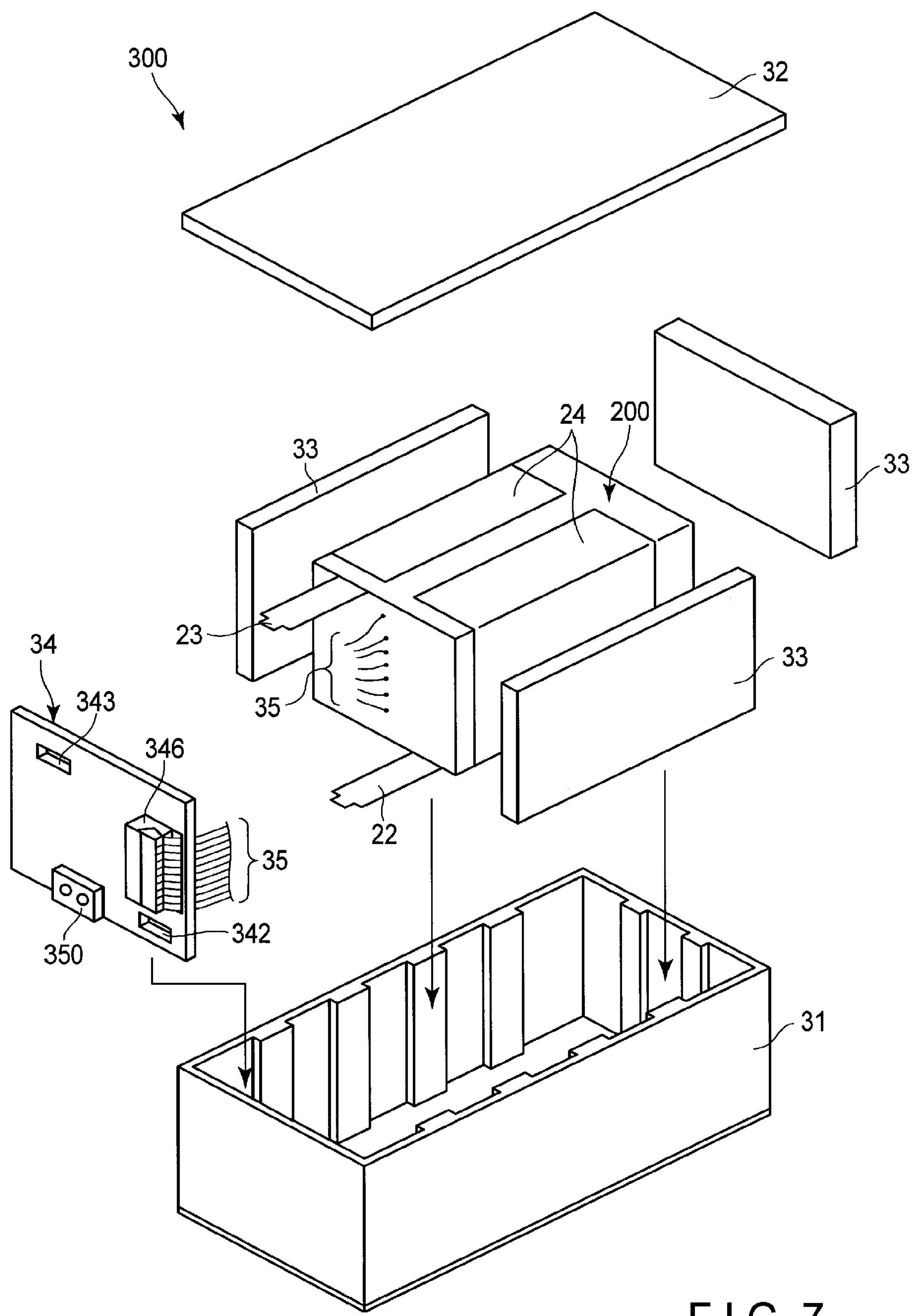
F I G. 7

ELECTRODE, SECONDARY BATTERY, BATTERY PACK, AND VEHICLE

CROSS-REFERENCE TO RELATED APPLICATIONS

This application is based upon and claims the benefit of priority from the Japanese Patent Applications No. 2019-052082, filed Mar. 20, 2019; and No. 2019-161875, filed Sep. 5, 2019, the entire contents of all of which are incorporated herein by reference.

FIELD

Embodiments described herein relate generally to an electrode, a secondary battery, a battery pack, and a vehicle.

BACKGROUND

A lithium ion secondary battery such as a nonaqueous electrolyte battery is a rechargeable battery that is charged and discharged by movement of lithium ions between a positive electrode and a negative electrode. The positive electrode and the negative electrode retain a nonaqueous electrolyte that contains lithium ions. Thereby, the movement of the lithium ions between the positive electrode and the negative electrode can be promoted.

The nonaqueous electrolyte battery is expected for its use not only as a power source for small-sized electronic equipment but also as a middle or large-sized power source for on-vehicle use, fixed use and the like. In particular, for the use as a middle or large-sized power source, it is required for the nonaqueous electrolyte battery to be unlikely to cause capacity decrease while being charged and discharged at a high currency, that is, to have high rate performances.

As a method for enhancing such rate performances of a secondary battery, for example, film thickness reduction and density reduction of an active material-containing layer of an electrode can be exemplified. According to these methods, conductivity of lithium ions in the active material-containing layer can be increased, thereby improving the rate performances. However, according to these methods, energy density of the secondary battery is decreased. Thus, it has been difficult to realize a secondary battery with the rate performances and the energy density that are both high.

BRIEF DESCRIPTION OF THE DRAWINGS

FIG. 1 is a cross-sectional view schematically illustrating an example of the electrode according to the embodiment;

FIG. 2 is a cross-sectional view schematically showing an example of a secondary battery according to the second embodiment;

FIG. 3 is an enlarged cross-sectional view of section A of the secondary battery shown in FIG. 2;

FIG. 4 is a partially cut-out perspective view schematically showing another example of a secondary battery according to the second embodiment;

FIG. 5 is an enlarged cross-sectional view of section B of the secondary battery shown in FIG. 4;

FIG. 6 is a perspective view schematically showing an example of the battery module according to the third embodiment;

FIG. 7 is an exploded perspective view schematically showing an example of the battery pack according to the fourth embodiment;

DETAILED DESCRIPTION

Figure 8:
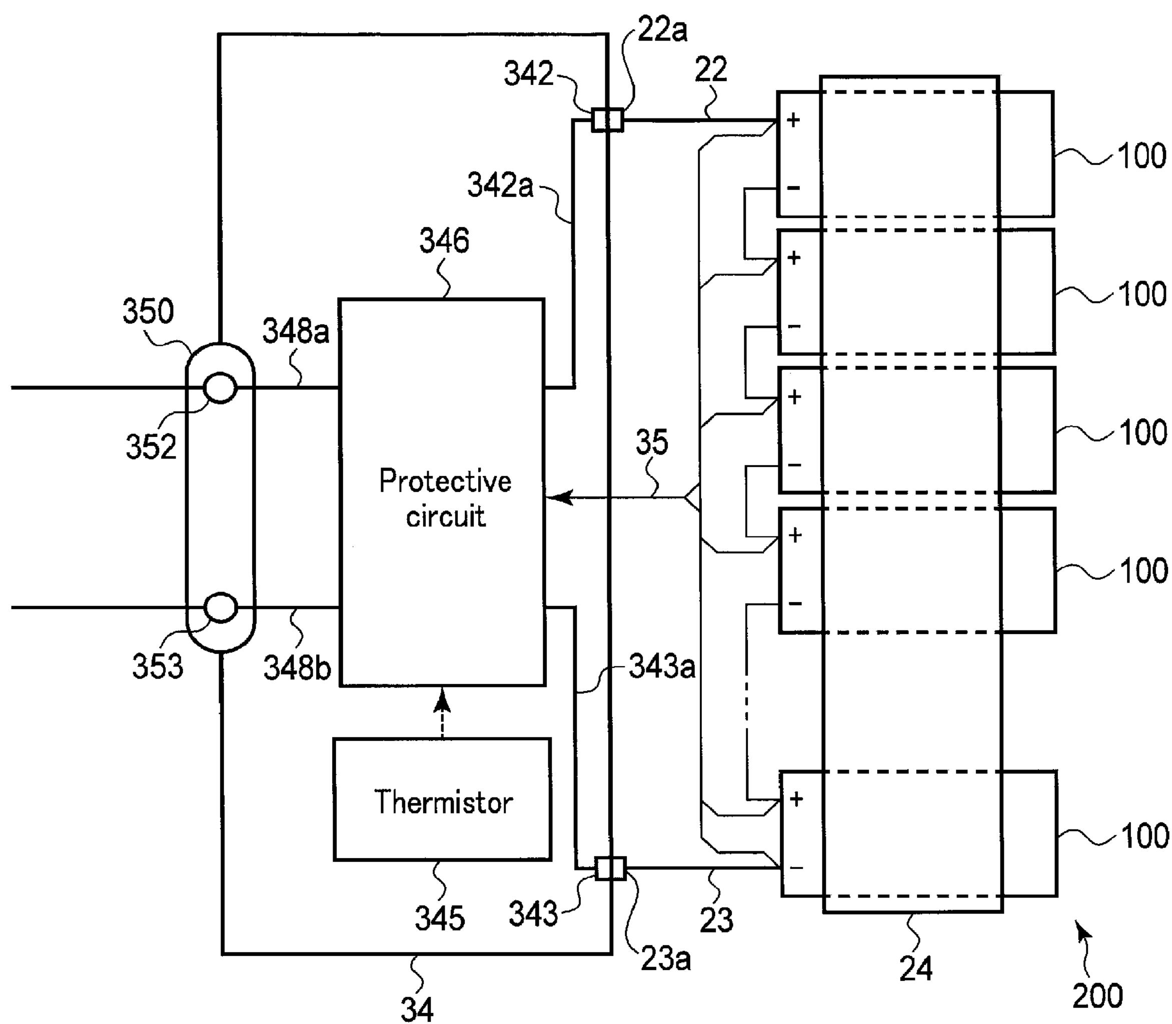
FIG. 8 is a block diagram showing an example of an electric circuit of the battery pack shown in FIG. 7.

According to one embodiment, an electrode is provided. The electrode includes a current collector and an active material-containing layer. The active material-containing layer is provided on the current collector. The active material-containing layer includes a first active material portion and a second active material portion. The first active material portion and the second active material portion are laminated with each other along a thickness direction and respectively contain active material particles. The first active material portion is positioned between the current collector and the second active material portion. A length of the first active material portion along a first direction is within a range of 0.7T or more and 0.95T or less with respect to a thickness T of the active material-containing layer. The first direction is parallel to the thickness direction. The second active material portion further contains solid electrolyte particles. A ratio E1/E2 is 0 or more and 0.01 or less. The ratio E1/E2 represents a ratio of a content E1 of the solid electrolyte particles per unit area in the first active material portion (including 0) to a content E2 of the solid electrolyte particles per unit area in the second active material portion.

According to another embodiment, a secondary battery is provided. The secondary battery includes a negative electrode, a positive electrode, and an electrolyte. At least one of the negative electrode and the positive electrode includes the electrode according to the embodiment.

According to another embodiment, a battery pack is provided. The battery pack includes the secondary battery according to the embodiment.

According to another embodiment, a vehicle is provided. The vehicle includes the battery pack according to the embodiment.

First Embodiment

According to an embodiment, an electrode is provided. The electrode includes a current collector and an active material-containing layer. The active material-containing layer is provided on the current collector. The active material-containing layer includes a first active material portion and a second active material portion. The first active material portion and the second active material portion are laminated with each other along a thickness direction and respectively contain active material particles. The first active material portion is positioned between the current collector and the second active material portion. A length of the first active material portion along a first direction is within a range of 0.7T or more and 0.95T or less with respect to a thickness T of the active material-containing layer. The first direction is parallel to the thickness direction. The second active material portion further contains solid electrolyte particles. A ratio E1/E2 is 0 or more and 0.01 or less. The ratio E1/E2 represents a ratio of a content E1 of the solid electrolyte particles per unit area in the first active material portion (including 0) to a content E2 of the solid electrolyte particles per unit area in the second active material portion.

The electrode according to the embodiment includes an active material-containing layer which includes a first active material portion positioned on a current collector side and a second active material portion positioned on a surface side. The active material-containing layer may have a double layer structure which includes the first active material portion and the second active material portion. The first active material portion contains active material particles, and arbitrarily contains solid electrolyte particles. The second active material portion contains active material particles and solid electrolyte particles. An amount of the solid electrolyte particles contained in the second active material portion is higher than an amount of the solid electrolyte particles contained in the first active material portion.

By the electrode according to the embodiment, a secondary battery with the rate performances and the energy density that are both high can be realized. That is, in a case of discharging the secondary battery which the positive electrode and the negative electrode are separated by a separator, lithium ions move from the negative electrode to the positive electrode, and proceed from an interface between the separator and a positive electrode active material-containing layer toward an inside of the positive electrode active material-containing layer so as to be inserted into positive electrode active material particles. In case of charging the secondary battery, the lithium ions move from the positive electrode to the negative electrode, and proceed from an interface between the separator and a negative electrode active material-containing layer toward an inside of the negative electrode active material-containing layer so as to be inserted into negative electrode active material particles. However, in a case of charging and discharging the secondary battery at a large current, concentration of the lithium ions is locally increased at the interface between the separator and the active material-containing layer, compared with a case of charging and discharging the secondary battery at a small current. Then, the lithium ions insertion or extraction reaction with the active material particles is caused concentratedly at this interface. Thereby, the movement of the lithium ions from a surface side to the inside of the active material-containing layer is inhibited, and a charge or discharge reaction is not caused sufficiently on the current collector side of the active material-containing layer, thereby decreasing a charge/discharge capacity.

As a method for improving such a problem, a method of mixing the solid electrolyte particles into the active material-containing layer can be exemplified. Since the solid electrolyte particles have excellent lithium ion conductivity, if mixing the solid electrolyte particles into the active material-containing layer, the lithium ion conductivity in the active material-containing layer can be increased to be higher than that in a case of containing no solid electrolyte particle. Whereas, if a ratio of the solid electrolyte particles in the active material-containing layer is increased, a ratio of the active material particles is decreased, whereby the energy density of the electrode can be decreased.

In the electrode according to the embodiment, the solid electrolyte particles are disposed on the surface side of the active material-containing layer, where the lithium ions are locally concentrated. Thereby, the charge and discharge reactions between the lithium ions and the active material particles on the surface side are suppressed to be caused concentrically, thereby promoting the movement of the lithium ions from the surface side to the inside of the active material-containing layer. Thus, in the active material-containing layer positioned on the current collector side, a ratio of the solid electrolyte particles is significantly lower than that of the active material-containing layer positioned on the surface side, or the insertion or the extraction reaction of the lithium ions can be caused sufficiently, even if containing no solid electrolyte particle. Therefore, the electrode according to the embodiment can decrease an amount of the solid electrolyte particles contained in the active material-containing layer positioned on the current collector side. As described above, the electrode according to the embodiment can have the excellent rate performances and the high energy density.

FIG. 1 is a cross-sectional view schematically illustrating an example of the electrode according to the embodiment. FIG. 1 is a cross-sectional view cut along an X-Z plane perpendicular to: an X direction that is a short side direction or a long side direction of an electrode 500; and a Z direction that is a thickness direction. The electrode 500 shown in FIG. 1 includes a current collector 50, and an active material-containing layer 51 which is provided on the current collector 50. The current collector 50 includes a part that does not support the active material-containing layer 51, that is, a tab 50*a*. The active material-containing layer 51 includes a first active material portion 511 and the second active material portion 512 that are laminated with each other along the Z direction. The first active material portion 511 is positioned between the current collector 50 and the second active material portion 512 in the Z direction. The first active material portion 511 can also be called as a current collector side portion of the active material-containing layer 51. Further, the second active material portion 512 can be also called as a surface side portion of the active material-containing layer 51.

A length L1 of the first active material portion 511 in the Z direction is a length from a main surface of the current collector 50 to a boundary BO between the first active material portion 511 and the second active material portion 512. The length L1 is within a range from 0.7T or more and 0.95T or less, with respect to a thickness T of the active material-containing layer. The length L1 is, for example, 15 μm or more to 80 μm or less.

A length L2 of the second active material portion 512 in the Z direction is a length from the boundary BO that is a surface of the first active material portion 511 to a main surface of the active material-containing layer 51. In other words, the length L2 is a value (T−L1) which is obtained by subtracting the length L1 of the first active material portion from the thickness T of the active material-containing layer. The length L2 is, for example, 3 μm or more and 20 μm or less.

The thickness T of the active material-containing layer, the lengths L1 and L2 of the first and second active material portions, a content E1 of the solid electrolyte particles per unit area in the first active material portion, and a content E2 of the solid electrolyte particles per unit area in the second active material portion can be confirmed by a following method.

Firstly, the electrode is taken out from the battery. If the active material particles of the electrode according to the embodiment include titanium dioxide, titanium composite oxide, niobium-titanium composite oxide or sodium-containing titanium composite oxide, in a case of using this electrode as a positive electrode, this electrode is preferably taken out while the battery is in a charging state. Further, in the case of using the electrode according to the embodiment as a negative electrode, this electrode is preferably taken out while the battery is in a discharging state.

If the active material particles of the electrode according to the embodiment include lithium-manganese composite oxide, lithium-nickel composite oxide, lithium-cobalt composite oxide, lithium-nickel-cobalt composite oxide, lithium-manganese-nickel composite oxide, lithium-manganese cobalt composite oxide, lithium iron phosphate or lithium-nickel-cobalt-manganese composite oxide, in a case of using this electrode as a positive electrode, this electrode is preferably taken out while the battery is in a discharging state. Further, in the case of using the electrode according to the embodiment as a negative electrode, this electrode is preferably taken out while the battery is in a charging state.

After washing the taken-out electrode with organic solvent, for example, ethyl methyl carbonate or the like, the current collector is removed so as to obtain a test piece. In this test piece, the main surface of the active material-containing layer that is exposed by the removal of the current collector is denoted by a deepest face. The main surface of the active material-containing layer on a side opposite to the deepest face is denoted by an outermost face. A length from the deepest face to the outermost face is measured using a Scanning Electron Microscope (SEM), whereby this length is denoted by the thickness T of the active material-containing layer.

Next, a cross-section of the active material-containing layer in its thickness direction is subjected to element analysis using an Energy Dispersive X-ray Spectrometry (EDX). Thereby, elements contained in the active material-containing layer can be confirmed.

Next, the outermost face is analyzed using an X-ray Photoelectron Spectroscopy (XPS). For the XPS analysis, the elements confirmed by the above-described EDX analysis excluding lithium and oxygen are selected. A measurement region of the XPS analysis is set to be, for example, 200 ump. Further, since the surface is analyzed by the XPS analysis, an analysis depth of the measurement region is 5 nm or less. By this XPS analysis, atomic concentration of each element on the deepest face of the active material-containing layer can be measured. Then, by calculating atomic concentration of the element that is peculiar to the solid electrolyte particles with respect to the atomic concentration of the observed elements excluding lithium and oxygen, a content of the solid electrolyte particles per unit area in the measurement region can be obtained.

The element peculiar to the solid electrolyte particles is at least one kind of an element that is selected from the group consisting of: for example, La; Zr; Al; and Ca. That is, a sum total of atomic concentration of La, Zr, Al and Ca which occupies the atomic concentration of the observed element excluding lithium and oxygen in the measurement region on the deepest face is calculated. For the calculation of the atomic concentration, this calculation of the sum total of the atomic concentration of the solid electrolyte particles is performed at five measurement points on the deepest face, and an average value of them is obtained. This average value is denoted by the content of the solid electrolyte particles on the deepest face. The five measurement points are provided, for example, at central positions in the short side direction on the deepest face, which have equal intervals along the long side direction.

Next, a region having a length that is $1/10$ of the thickness T of the active material-containing layer along the thickness direction of the active material-containing layer from the deepest face is removed so as to expose a face of the active material-containing layer, which is positioned at a depth that is $1/10$ of the thickness T of the active material-containing layer from the deepest face, and is parallel to the deepest face. Hereinafter, this face is denoted by a first face. For cutting the active material-containing layer, a surface cutting apparatus such as, for example, a SAICAS (registered trademark, Surface And Interfacial Cutting Analysis System) is used. Incidentally, the depth of the region to be removed may be a thickness of 3 μm. The first face is subjected to XPS analysis by a method similar to the method for analyzing the deepest face, thereby obtaining the content of the solid electrolyte particles on the first face.

A series of these operations is performed for each length that is $1/10$ of the thickness T of the active material-containing layer along the thickness direction of the active material-containing layer until reaching an Xth face. The Xth face is a face of the active material-containing layer, which is obtained by an Xth operation, is positioned at a depth that is $1/10$ TX of the thickness T of the active material-containing layer from the deepest face of the active material-containing layer, and is parallel to the deepest face, and on which an average value of the content of the solid electrolyte particles exceeds a threshold value for the first time. The threshold value is, for example, 100 times as high as an average value of contents of the solid electrolyte particles on a first face to an (X−1)th face. The threshold value is, for example, 10 atm %. The (X−1)th face is a face obtained by an operation just before that of the Xth face. The average value of the contents of the solid electrolyte particles on the first face to the (X−1)th face is denoted by a content E1 of the solid electrolyte particles per unit area of the first active material portion.

Next, a position of a face, which is positioned at a middle between the Xth face and the (X−1)th face and is parallel to the deepest face, is confirmed. That is, the face positioned at the middle between the Xth face and the (X−1)th face is positioned at ($1/10$ TX−$1/20$ T) μm from the deepest face. This face is a boundary face between the first active material portion and the second active material portion.

Next, the above-described series of the operations is performed after obtaining the Xth face until reaching the outermost face. An average value of contents of the solid electrolyte particles on the Xth face to the outermost face is denoted by a content E2 of the solid electrolyte particles per unit area of the second active material portion.

Further, by the above-described method, the length L1 of the first active material portion and the length L2 of the second active material portion can be calculated. That is, the length of the first active material portion is ($1/10$ TX−$1/20$ T) μm, and the length of the second active material portion is (T−($1/10$ TX−$1/20$ T)) μm. Herein, T denotes the thickness of the active material-containing layer.

The content E1 of the solid electrolyte particles per unit area in the first active material portion is preferably lower than 0.1 atm %, and is more preferably 0.07 atm % or lower. The content E1 of the solid electrolyte particles per unit area of the first active material portion is further preferably 0 atm %. If the content E1 is low, the ratio of the active material particles can be increased, and the energy density of the secondary battery can be further increased. The content E1 may be more than 0 atm %.

The content E2 of the solid electrolyte particles per unit area in the second active material portion is preferably 10 atm % or higher, and is more preferably 10.5 atm % or higher. If the content E2 is high, the movement of the lithium ions on the surface side of the active material-containing layer is promoted, thereby enhancing the rate performances. Whereas, if the content E2 is excessively high, the ratio of the active material particles and the energy density of the secondary battery can be decreased. Thus, the content E2 is preferably 18 atm % or lower, and is further preferably 15 atm % or lower.

It is preferable that, in the second active material portion, the solid electrolyte particles are mixed uniformly in the active material-containing layer. In such a state, the conductivity of the lithium ions can be further increased. The state in which the solid electrolyte particles are mixed uniformly in the second active material portion means that a value obtained by subtracting the average value of the solid electrolyte content on each of the Xth face to the outermost face from the content E2 of the second active material portion is within a range from −4% or more and 4% or less respectively.

Further, also in the case where the first active material portion contains the solid electrolyte particles, it is preferable that the solid electrolyte particles are mixed uniformly in the active material-containing layer. The state in which the solid electrolyte particles are mixed uniformly in the first active material portion means that a value obtained by subtracting the content of the solid electrolyte particles on each of the deepest face to the (X−1)th face from the content E1 of the solid electrolyte particles in the second active material portion is within a range from −4% or more and 4% or less respectively.

A content E3 of the active material particles per unit area in the first active material portion is preferably 50 atm % or higher, and is more preferably 80 atm % or higher. If the content E3 is high, the ratio of the active material particles can be increased, and the energy density of the secondary battery can be further increased. An upper limit value of the content E3 is 90 atm % or lower, as an example.

A content E4 of the active material particles per unit area in the second active material portion is preferably 30 atm % or higher, and is more preferably 60 atm % or higher. If the content E4 is high, the energy density of the secondary battery can be decreased. Whereas, if the content E4 is excessively high, the rate performances can be degraded. Thus, the content E4 is preferably 85 atm % or lower, and is more preferably 80 atm % or lower.

The contents E3 and E4 of the active material particles per unit area of the first active material portion and the second active material portion can be calculated by methods that are respectively similar to the above-described methods for calculating the contents E1 and E2 of the solid electrolyte particles per unit area.

In a case where the electrode is a positive electrode, an element peculiar to positive electrode active material particles is at least one kind selected from the group consisting of: Ni; Mn; Co; and Fe. Thus, a sum total of atomic concentration of these elements with respect to atomic concentration of the observed elements excluding lithium and oxygen is regarded as the content of the active material particles.

In a case where the electrode is a negative electrode, an element peculiar to negative electrode active material particles is at least one kind selected from the group consisting of: Ti; Nb; Si; and C. Thus, a sum total of atomic concentration of these elements with respect to the atomic concentration of the observed elements excluding lithium and oxygen is regarded as the content of the active material particles.

As the solid electrolyte particles, an inorganic solid electrolyte is preferably used. As the inorganic solid electrolyte, for example, an oxide-based solid electrolyte and a sulfide-based solid electrolyte can be exemplified.

As the solid electrolyte particles, it is preferable to use at least one kind selected from the group consisting of: perovskite-type lithium lanthanum titanium-containing oxide; garnet-type lithium lanthanum zirconium-containing oxide; NASICON-type lithium aluminum titanium-containing oxide; and lithium calcium zirconium-containing oxide.

As the oxide-based solid electrolyte, it is preferable to use a lithium phosphoric acid solid electrolyte which has a NASICON-type structure and is represented by a general formula of $LiM_2(PO_4)_3$. The M in the above-described general formula is preferably at least one or more kinds of elements selected from the group consisting of: titanium (Ti); germanium (Ge); strontium (Sr); zirconium (Zr); tin (Sn); aluminum (Al); and calcium (Ca). The element M is more preferably at least one or more kinds of elements selected from the group consisting of: Zr; Ca; Al; and Ti.

As specific examples of the lithium phosphoric acid solid electrolyte having the NASICON-type structure, LATP ($Li_{1+x}Al_xTi_{2-x}(PO_4)_3$), $Li_{1+x}Al_xGe_{2-x}(PO_4)_3$ and $Li_{1+x}Al_xZr_{2-x}(PO_4)_3$ can be exemplified. The x in the above-described formulae is within a range of $0<x\leq5$, and is preferably within a range of $0.1\leq x\leq0.5$. As the solid electrolyte, it is preferably use LATP.

Further, as the oxide-based solid electrolyte, amorphous LIPON ($Li_{2.9}PO_{3.3}N_{0.46}$) or LLZ ($Li_7La_3Zr_2O_{12}$) having a garnet-type structure may be used. The solid electrolyte may be one kind or a mixture of two kinds or more.

The active material-containing layer can be formed on one side or both sides of the current collector. The active material-containing layer contains the active material, and can arbitrarily contain a conductive agent and a binder. The active material-containing layer can contain the active material alone or two kinds or more. The electrode according to the embodiment may be used as a positive electrode or as a negative electrode.

The electrode according to the embodiment in the case of being used as a negative electrode will be explained in detail.

As a negative electrode active material, it is preferable to use lithium titanate having a ramsdellite structure (for example, $Li_{2+y}Ti_3O_7$, $0\leq y\leq3$), lithium titanate having a spinel structure (for example, $Li_{4+x}Ti_5O_{12}$, $0\leq x\leq3$), monoclinic titanium dioxide ($TiO_2$), anatase-type titanium dioxide, rutile-type titanium dioxide, hollandite-type titanium composite oxide, orthorhombic titanium composite oxide and monoclinic niobium-titanium composite oxide.

Examples of the orthorhombic titanium composite oxide includes a compound represented by a general formula of $Li_{2+a}M(I)_{2-b}Ti_{6-c}M(II)_dO_{14+\sigma}$. M(I) is at least one element selected from the group consisting of Sr, Ba, Ca, Mg, Na, Cs, Rb, and K. M(II) is at least one element selected from the group consisting of Zr, Sn, V, Nb, Ta, Mo, W, Y, Fe, Co, Cr, Mn, Ni, and Al. In the general formula, $0\leq a\leq6$, $0\leq b<2$, $0\leq c<6$, $0\leq d<6$, $-0.5\leq\delta\leq0.5$. Specific examples of the orthorhombic titanium composite oxide include $Li_{2+a}Na_2Ti_6O_{14}$ ($0\leq a\leq6$).

As an example of the monoclinic niobium titanium composite oxide, a compound represented by $Li_xTi_{1-y}M1_yNb_{2-z}M2_zO_{7+\delta}$ can be exemplified. Herein, M1 is at least one selected from the group consisting of: Zr; Si; and Sn. M2 is at least one selected from the group consisting of: V; Ta; and Bi. Respective subscripts in the composition formulae represent $0\leq x\leq5$, $0\leq y<1$, $0\leq z\leq2$ and $-0.3\leq\delta\leq0.3$. As a specific example of the monoclinic-system niobium-titanium composite oxide, $Li_xNb_2TiO_7$ ($0\leq x\leq5$) can be exemplified.

As other example of the monoclinic niobium-titanium composite oxide, a compound represented by $Li_xTi_{1-y}M3_{y+z}Nb_{2-z}O_{7-\delta}$ can be exemplified. Herein, M3 is at least one selected from Mg, Fe, Ni, Co, W, Ta and Mo. Respective subscripts in the composition formula represent $0\leq x<5$, $0\leq y<1$, $0\leq z\leq2$ and $-0.3\leq\delta\leq0.3$.

The conductive agent is blended to enhance a current collecting performance and to suppress contact resistance between the active material and the current collector. Examples of the conductive agent include Vapor Grown Carbon Fiber (VGCF), carbon black such as acetylene black, and carbonaceous materials such as graphite. One of them may be used as the conductive agent, or two or more may be used in combination as the conductive agent. Further, instead of using the conductive agent, carbon coating or electronic conductive inorganic material coating may be applied onto surfaces of the active material particles.

The binder is blended to embed gaps of the dispersed active material, and to bind the active material and a negative electrode current collector. Examples of the binder include polytetrafluoro ethylene (PTFE), polyvinylidene fluoride (PVdF), fluororubber, styrene-butadiene rubber, a polyacrylic acid compound, an imide compound, carboxymethyl cellulose (CMC) and salts of CMC. One of them may be used as the binder, or two or more may be used in combination as the binder.

A blend of the active material (negative electrode active material), the conductive agent and the binder in the active material-containing layer is preferably in a ratio of: 68% by mass or more to 96% by mass or less; 2% by mass or more to 30% by mass or less; and 2% by mass or more to 30% by mass or less, respectively. By setting the amount of the conductive agent to be 2% by mass or more, the current collecting performance of the active material-containing layer can be improved. Further, by setting the amount of the binder to be 2% by mass or more, the binding property between the active material-containing layer and the current collector can be sufficient, whereby an excellent cyclic performance can be expected. Whereas, it is preferable that the amounts of the conductive agent and the binder are respectively 30% by mass or less for increasing the capacity.

Density of the negative electrode active material-containing layer is preferably 1.0 g/cm$^3$ or more and 1.5 g/cm$^3$ or less, in a case of using a carbon material as the active material. In a case of using titanium composite oxide as the active material, the density is preferably 2.0 g/cm$^3$ or more and 2.8 g/cm$^3$ or less.

The negative electrode of which the density of the negative electrode active material-containing layer is within this range is superior in both in the energy density and the retention of the electrolyte. The density of the negative electrode active material-containing layer is more preferably 1.1 g/cm$^3$ or more and 1.3 g/cm$^3$ or less, in the case of using a carbon material as the active material. In the case of using titanium composite oxide as the active material, the density is more preferably 2.1 g/cm$^3$ or more and 2.5 g/cm$^3$ or less.

The current collector adopts a material which is electrochemically stable in electric potential at which lithium (Li) is inserted into and extracted from the active material. The current collector is preferably made of copper, nickel, stainless steel, aluminum or aluminum alloy which contains one or more elements selected from: Mg; Ti; Zn; Mn; Fe; Cu; and Si. A thickness of the current collector is preferably 5 μm or more and 20 μm or less. The current collector having such a thickness can balance both of strength of the electrode and weight reduction.

Further, the current collector can include a part which has no the negative electrode active material-containing layer formed on a surface thereof. This part can serve as a negative electrode collector tab.

The electrode can be produced by, for example, a following method. Firstly, the active material, the conductive agent and the binder are suspended into solvent so as to prepare slurry. This slurry is applied onto one or both of faces of the current collector. Subsequently, the applied slurry is dried, thereby obtaining a laminate of the active material-containing layer and the current collector. Thereafter, this laminate is pressed. In this way, the electrode is produced.

Alternatively, the electrode may be produced by a following method. Firstly, the active material, the conductive agent and the binder are mixed so as to obtain a mixture. Subsequently, this mixture is shaped into pellets. Thereafter, these pellets are disposed on the current collector, thereby obtaining the electrode.

Next, the case of using the electrode according to the embodiment as the positive electrode will be described in detail.

As the positive electrode active material, for example, oxide or sulfide can be used. The positive electrode may contain one kind of a compound alone, or may contain two or more kinds of compounds in combination as the positive electrode active material. As an example of the oxide and the sulfide, a compound which Li or Li ions can be inserted into and left from can be exemplified.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_2O_2$; $0<x\leq1$, $0<y<1$, $0<z<1$, $y+z<1$).

More preferred examples of the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $LiNi_{1-y}Co_yO_2$; $0<x\leq1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When an room temperature molten salt is used as the nonaqueous electrolyte of the battery, preferred examples of the positive electrode active material include lithium iron phosphate, $Li_xVPO_4F$ ($0\leq x\leq1$), lithium manganese composite oxide, lithium nickel composite oxide, and lithium nickel cobalt composite oxide. Since these compounds have low reactivity with room temperature molten salts, cycle life can be improved. The room temperature molten salt will be described later in detail.

The primary particle size of the positive electrode active material is preferably within a range of from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably within a range of from 0.1 $m^2/g$ to 10 $m^2/g$. The positive electrode active material having a specific surface area of 0.1 $m^2/g$ or more can secure sufficient sites for inserting and extracting Li ions. The positive electrode active material having a specific surface area of 10 $m^2/g$ or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylic acid compounds, imide compounds, carboxy methyl cellulose (CMC), and salts of the CMC. One of these may be used as the binder, or two or more may be used in combination as the binder.

The conductive agent is added to improve a current collection performance and to suppress the contact resistance between the active material and the current collector. Examples of the conductive agent include vapor grown carbon fiber (VGCF), carbon black such as acetylene black, and carbonaceous substances such as graphite. One of these may be used as the conductive agent, or two or more may be used in combination as the conductive agent. The conductive agent may be omitted.

In the positive electrode active material-containing layer, the positive electrode active material and binder are preferably blended in proportions within ranges of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of insulator in the electrode is reduced, and thereby the internal resistance can be decreased.

When a conductive agent is added, the positive electrode active material, binder, and conductive agent are preferably blended in proportions of 77% by mass to 95% by mass, 2% by mass to 20% by mass, and 3% by mass to 15% by mass, respectively.

When the amount of the conductive agent is 3% by mass or more, the above-described effects can be expressed. By setting the amount of the conductive agent to 15% by mass or less, the proportion of conductive agent that contacts the electrolyte can be made low. When this proportion is low, the decomposition of an electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably within a range of from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The density of the positive electrode active material-containing layer is preferably 2.6 $g/cm^3$ or more and 3.4 $g/cm^3$ or less. The positive electrode of which the density of the positive electrode active material-containing layer is within this range is superior in both of the energy density and the retention of the electrolyte. The density of the positive electrode active material-containing layer is more preferably 2.8 $g/cm^3$ or more and 3.2 $g/cm^3$ or less.

The positive electrode current collector can include a portion on one side where the positive electrode active material-containing layer is not carried on any surfaces. This portion acts as a positive electrode current collector tab.

Next, a method for manufacturing the electrode according to the embodiment will be described.

Firstly, first slurry for forming the first active material portion is prepared. The first slurry can be obtained by mixing the active material particles, the arbitrarily contained solid electrolyte particles, conductive agent and binder, with the solvent. In the components of the first slurry excluding the solvent, a ratio of the active material particles, the solid electrolyte particles, the conductive agent and the binder is preferably: 70% by mass or more and 90% by mass or less; 0% by mass or more and 0.1% by mass or less; 1% by mass or more and 15% by mass or less; 1% by mass or more and 15% by mass or less.

Next, second slurry for forming the second active material portion is prepared. The second slurry can be obtained by mixing the active material particles, the solid electrolyte particles, the arbitrarily contained conductive agent and binder, with the solvent. Respective kinds of the active material particles, the solid electrolyte particles, the conductive agent and the binder contained in the second slurry may be the same as or different from those contained in the first slurry. In the components of the second slurry excluding the solvent, a ratio of the active material particles, the solid electrolyte particles, the conductive agent and the binder is preferably: 70% by mass or more and 90% by mass or less; 5% by mass or more and 20% by mass or less; 1% by mass or more and 10% by mass or less; 1% by mass or more and 10% by mass or less.

Next, the first slurry and the second slurry are applied onto the current collector simultaneously so as to be overlapped with each other. For the simultaneous application of the first slurry and the second slurry, for example, a coater having a first discharge port and a second discharge port that are vertically arranged is used. The first discharge port communicates with a first storage unit for storing the first slurry. The second discharge port communicates with a second storage unit for storing the second slurry.

The first and second slurry applied onto the current collector is dried so as to obtain a laminate. This laminate is subjected to press treatment, and is cut into a predetermined size. The cut laminate is dried in vacuum, thereby obtaining the electrode that includes the first and second active material portions.

The above-explained electrode according to the first embodiment includes: the second active material portion which contains the solid electrolyte particles; and the first active material portion which contains the solid electrolyte particles by a content less than that in the second active material portion or contains no solid electrolyte particle. Thus, if using this electrode, a secondary battery that is superior in both of the rate performances and the energy density can be realized.

Second Embodiment

According to a second embodiment, a secondary battery including a negative electrode, a positive electrode and electrolyte can be provided. At least one of the negative electrode and the positive electrode is the electrode according to the first embodiment.

The secondary battery according to the second embodiment can be further provided with a separator, which is disposed between the positive electrode and the negative electrode. The negative electrode, the positive electrode and the separator can structure an electrode group. The electrolyte can be retained in the electrode group.

In addition, the secondary battery according to the second embodiment can be further provided with a container member for storing the electrode group and the electrolyte.

Moreover, the secondary battery according to the second embodiment can be further provided with: a negative electrode terminal which is electrically connected to the negative electrode; and a positive electrode terminal which is electrically connected to the positive electrode.

The secondary battery according to the second embodiment can be, for example, a lithium secondary battery. Further, the secondary battery include a nonaqueous electrolyte secondary battery that contains a nonaqueous electrolyte.

Hereinafter, the electrolyte, the separator, the container member, the negative electrode terminal and the positive electrode terminal will be described in detail.

1) Electrolyte

As the electrolyte, for example, a liquid nonaqueous electrolyte or a gel nonaqueous electrolyte may be used. The liquid nonaqueous electrolyte is prepared by dissolving an electrolyte salt in an organic solvent. The concentration of the electrolyte salt is preferably 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethansulfonate ($LiCF_3SO_3$), bistrifluoromethylsulfonylimide lithium (LiTFSI; $LiN(CF_3SO_2)_2$), and mixtures thereof. The electrolyte salt is preferably less likely to be oxidized even at high potentials, and $LiPF_6$ is most preferred.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel-like nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, the nonaqueous electrolyte may be, for example, a room temperature molten salt (ionic melt) including lithium ions, a polymer solid electrolyte, or an inorganic solid electrolyte, other than the liquid nonaqueous electrolyte or the gel nonaqueous electrolyte.

The room temperature molten salt (ionic melt) means compounds which may exist in a liquid state at normal temperature (15 to 25° C.) among organic salts constituted of combinations of organic cations and anions. The room temperature molten salts include those which singly exist in a liquid state, those which are put into a liquid state when mixed with an electrolyte, those which are put into a liquid state when dissolved in an organic solvent, and mixture thereof. Generally, the melting point of the room temperature molten salt used in a secondary battery is 25° C. or less. Further, the organic cation generally has a quaternary ammonium skeleton.

The polymer solid electrolyte is prepared by dissolving the electrolyte salt in a polymeric material, and solidifying it.

The inorganic solid electrolyte is a solid substance having lithium ion conductivity.

2) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

3) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member can be properly selected depending on battery size or intended use of the battery.

4) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

5) Positive Electrode Terminal

The positive electrode terminal may be made of, for example, a material that is electrically stable in the potential range of 3 V to 4.5 V (vs. $Li/Li^+$) relative to the oxidation-and-reduction potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the second embodiment will be more specifically described with reference to the drawings.

FIG. 2 is a cross-sectional view schematically showing an example of a secondary battery according to the second embodiment. FIG. 3 is an enlarged cross-sectional view of section A of the secondary battery shown in FIG. 2.

The secondary battery 100 shown in FIGS. 2 and 3 includes a bag-shaped container member 2 shown in FIG. 2, an electrode group 1 shown in FIGS. 2 and 3, and an electrolyte, which is not shown. The electrode group 1 and the electrolyte are housed in the bag-shaped container member 2. The electrolyte (not shown) is held in the electrode group 1.

The bag shaped container member 2 is made of a laminate film including two resin layers and a metal layer sandwiched between the resin layers.

As shown in FIG. 2, the electrode group 1 is a wound electrode group in a flat form. The wound electrode group 1 in a flat form includes a negative electrode 3, a separator 4, and a positive electrode 5, as shown in FIG. 3. The separator 4 is sandwiched between the negative electrode 3 and the positive electrode 5.

The negative electrode 3 includes a negative electrode current collector 3*a* and a negative electrode active material-containing layer 3*b*. The active material is included in the negative electrode active material-containing layer 3*b*. At the portion of the negative electrode 3 positioned outermost among the wound electrode group 1, the negative electrode active material-containing layer 3*b* is formed only on an inner surface of the negative electrode current collector 3*a*, as shown in FIG. 3. For the other portions of the negative electrode 3, negative electrode active material-containing layers 3*b* are formed on both of reverse surfaces of the negative electrode current collector 3*a*.

The positive electrode 5 includes a positive electrode current collector 5*a* and positive electrode active material-containing layers 5*b* formed on both of reverse surfaces of the positive electrode current collector 5*a*.

As shown in FIG. 2, a negative electrode terminal 6 and positive electrode terminal 7 are positioned in vicinity of the outer peripheral edge of the wound electrode group 1. The negative electrode terminal 6 is connected to a portion of the negative electrode current collector 3*a* of the negative electrode 3 positioned outermost. The positive electrode terminal 7 is connected to the positive electrode current collector 5*a* of the positive electrode 5 positioned outermost. The negative electrode terminal 6 and the positive electrode terminal 7 extend out from an opening of the bag-shaped container member 2. The bag-shaped container member 2 is heat-sealed by a thermoplastic resin layer arranged on the interior thereof.

The secondary battery according to the second embodiment is not limited to the secondary battery of the structure shown in FIGS. 2 and 3, and may be, for example, a battery of a structure as shown in FIGS. 4 and 5.

FIG. 4 is a partially cut-out perspective view schematically showing another example of a secondary battery according to the second embodiment. FIG. 5 is an enlarged cross-sectional view of section B of the secondary battery shown in FIG. 4.

The secondary battery 100 shown in FIGS. 4 and 5 includes an electrode group 1 shown in FIGS. 4 and 5, a container member 2 shown in FIG. 4, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 5, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes a plurality of the negative electrodes 3. Each of the negative electrodes 3 includes the negative electrode current collector 3*a* and the negative electrode active material-containing layers 3*b* supported on both surfaces of the negative electrode current collector 3*a*. The electrode group 1 further includes a plurality of the positive electrodes 5. Each of the positive electrodes 5 includes the positive electrode current collector 5*a* and the positive electrode active material-containing layers 5*b* supported on both surfaces of the positive electrode current collector 5*a*.

The negative electrode current collector 3*a* of each of the negative electrodes 3 includes at its side a portion 3*c* where the negative electrode active material-containing layer 3*b* is not supported on any surface. This portion 3*c* serves as a negative electrode tab. As shown in FIG. 5, the portion 3*c* serving as the negative electrode tab does not overlap the positive electrode 5. A plurality of the negative electrode tabs (portions 3*c*) are electrically connected to the belt-like negative electrode terminal 6. A leading end of the belt-like negative electrode terminal 6 is drawn to the outside from a container member 2.

Although not shown, the positive electrode current collector 5*a* of each of the positive electrodes 5 includes at its side a portion where the positive electrode active material-containing layer 5*b* is not supported on any surface. This portion serves as a positive electrode tab. Like the negative electrode tab (portion 3 *c*), the positive electrode tab does not overlap the negative electrode 3. Further, the positive electrode tab is located on the opposite side of the electrode group 1 with respect to the negative electrode tab (portion 3*c*). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

The secondary battery according to the second embodiment includes the electrode according to the first embodiment. For this reason, the secondary battery according to the second embodiment can implement excellent rate performance and the energy density.

Third Embodiment

According to a third embodiment, a battery module is provided. The battery module according to the third embodiment includes plural secondary batteries according to the second embodiment.

In the battery module according to the third embodiment, each of the single batteries may be arranged electrically connected in series, in parallel, or in a combination of in-series connection and in-parallel connection.

An example of the battery module according to the third embodiment will be described next with reference to the drawings.

FIG. 6 is a perspective view schematically showing an example of the battery module according to the third embodiment. A battery module 200 shown in FIG. 6 includes five single-batteries 100*a* to 100*e*, four bus bars 21, a positive electrode-side lead 22, and a negative electrode-side lead 23. Each of the five single-batteries 100*a* to 100*e* is a secondary battery according to the second embodiment.

For example, a bus bar 21 connects a negative electrode terminal 6 of one single-battery 100*a* and a positive electrode terminal 7 of the single-battery 100*b* positioned adjacent. The five single-batteries 100 are thus connected in series by the four bus bars 21. That is, the battery module 200 shown in FIG. 6 is a battery module of five in-series connection. In the battery module including a plurality of the single-batteries which are electrically connected in parallel, the plurality of the single-batteries can be electrically connected to each other, by, for example, connecting a plurality of the negative electrode terminals to each other via a bus bar and connecting a plurality of the positive electrode terminals to each other via a bus bar, which is not illustrated though.

A positive electrode terminal 7 of at least one cell among five single-batteries 100*a* to 100*e* is electrically connected to a positive electrode lead 22 for external connection. Further, a negative electrode terminal 6 of at least one cell among the five single-batteries 100*a* to 100*e* is electrically connected to a negative electrode lead 23 for external connection.

The battery module according to the third embodiment includes the secondary battery according to the second embodiment. Hence, the battery module according to the third embodiment can implement excellent rate performance and the energy density.

Fourth Embodiment

According to a fourth embodiment, a battery pack is provided. The battery pack includes a battery module according to the third embodiment. The battery pack may include a single secondary battery according to the second embodiment, in place of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fourth embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to fourth the embodiment will be described with reference to the drawings.

FIG. 7 is an exploded perspective view schematically showing an example of the battery pack according to the fourth embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

The housing container 31 shown in FIG. 7 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to store the battery module 200 and so on. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and an adhesive tape 24.

At least one of the plural single-batteries 100 is a secondary battery according to the second embodiment. The plural single-batteries 100 are electrically connected in series, as shown in FIG. 8. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

An end of the positive electrode-side lead 22 is connected to the battery module 200. The end of the positive electrode-side lead 22 is electrically connected to a positive electrode of one or more of the single-batteries 100. An end of the negative electrode-side lead 23 is connected to the battery module 200. The end of the negative electrode-side lead 23 is electrically connected to a negative electrode of one or more of the single-batteries 100.

A printed wiring board 34 is disposed on the one inner surface along the short-side direction of inner surfaces of the housing container 31. The printed wiring board 34 includes a positive electrode-side connector 342, a negative electrode-side connector 343, a thermistor 345, a protective circuit 346, wirings 342*a* and 343*a*, an external power distribution terminal 350, a plus-side (positive-side) wire 348*a*, and a minus-side (negative-side) wire 348*b*. One main surface of the printed wiring board 34 faces one side surface of the battery module 200. An insulating plate (not shown) is disposed in between the printed wiring board 34 and the battery module 200.

To the positive electrode-side connector 342, other end 22*a* of the positive electrode-side lead 22 is electrically connected. To the negative electrode-side connector 343, other end 23*a* of the negative electrode-side lead 23 is electrically connected.

The thermistor 345 is fixed to one main surface of the printed wiring board 34. The thermistor 345 detects the temperature of each single-battery 100 and transmits detection signals to the protective circuit 346.

The external power distribution terminal 350 is fixed to the other main surface of the printed wiring board 34. The external power distribution terminal 350 is electrically connected to device(s) that exists outside the battery pack 300. The external power distribution terminal 350 includes positive-side terminal 352 and negative-side terminal 353.

The protective circuit 346 is fixed to the other main surface of the printed wiring board 34. The protective circuit 346 is connected to the positive-side terminal 352 via the plus-side wire 348*a*. The protective circuit 346 is connected to the negative-side terminal 353 via the minus-side wire 348*b*. In addition, the protective circuit 346 is electrically connected to the positive electrode-side connector 342 via the wiring 342*a*. The protective circuit 346 is electrically connected to the negative electrode-side connector 343 via the wiring 343*a*. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction, facing the printed wiring board 34 across the battery module 200 positioned therebetween. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external devices, based on detection signals transmitted from the thermistor 345 or detection signals transmitted from each single-battery 100 or the battery module 200.

An example of the detection signal transmitted from the thermistor 345 is a signal indicating that the temperature of the single-battery (single-batteries) 100 is detected to be a predetermined temperature or more. An example of the detection signal transmitted from each single-battery 100 or the battery module 200 is a signal indicating detection of over charge, over discharge, and overcurrent of the single-battery (single-batteries) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note that, as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used respectively as a positive-side terminal 352 and a negative-side terminal 353 of the external power distribution terminal 350.

Such a battery pack 300 is used, for example, in applications where excellent cycle performance is demanded when a large current is extracted. More specifically, the battery pack 300 is used as, for example, a power source for electronic devices, a stationary battery, or an onboard battery for vehicles. An example of the electronic device is a digital camera. The battery pack 300 is particularly favorably used as an onboard battery.

The battery pack according to the fourth embodiment includes the secondary battery according to the second embodiment or the battery module according to the third embodiment. Hence, the battery pack according to the fourth embodiment can implement excellent rate performance and the energy density.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle. The vehicle may include a mechanism for converting kinetic energy of this vehicle into regenerative energy (Regenerator).

Examples of the vehicle according to the fifth embodiment include two- to four-wheeled hybrid electric automobiles, two- to four-wheeled electric automobiles, electric assist bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

The vehicle according to the fifth embodiment may be equipped with a plurality of the battery packs. In this case, batteries included in the respective battery packs may be electrically connected to each other in series, may be electrically connected to each other in parallel, or may be electrically connected to each other by a combination of series connections and parallel connections. For example, in a case where each battery pack includes a battery module, the battery modules may be electrically connected to each other in series, may be electrically connected to each other in parallel, or may be electrically connected to each other by a combination of series connections and parallel connections. Alternatively, in a case where each battery pack includes a single battery, the respective batteries may be electrically connected to each other in series, may be electrically connected in parallel, or may be electrically connected to each other by a combination of series connections and parallel connections.

An example of the vehicle according to the fifth embodiment is explained below, with reference to the drawings.

Figure 9:
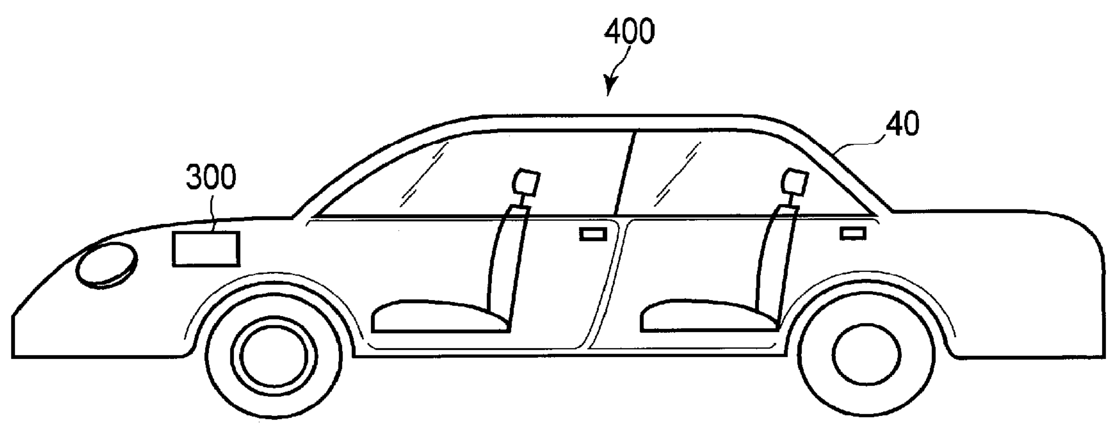
FIG. 9 is a partial perspective view that schematically illustrates an example of the vehicle according to the fifth embodiment.

FIG. 9 is a partial perspective view that schematically illustrates an example of the vehicle according to the fifth embodiment.

A vehicle 400, shown in FIG. 9 includes a vehicle body 40 and a battery pack 300 according to the fourth embodiment. In FIG. 9, the vehicle 400 is a four-wheeled automobile.

This vehicle 400 may have plural battery packs 300 installed. In such a case, the batteries (for example, single battery or battery module) included in the battery packs 300 may be connected in series, connected in parallel, or connected in a combination of in-series connection and in-parallel connection.

An example is shown in FIG. 9, where the battery pack 300 is installed in an engine compartment located at the front of the vehicle body 40. As described above, the battery pack 300 may be installed, for example, in rear sections of the vehicle body 40, or under a seat. The battery pack 300 may be used as a power source of the vehicle 400. The battery pack 300 can also recover regenerative energy of power of the vehicle 400.

Figure 10:
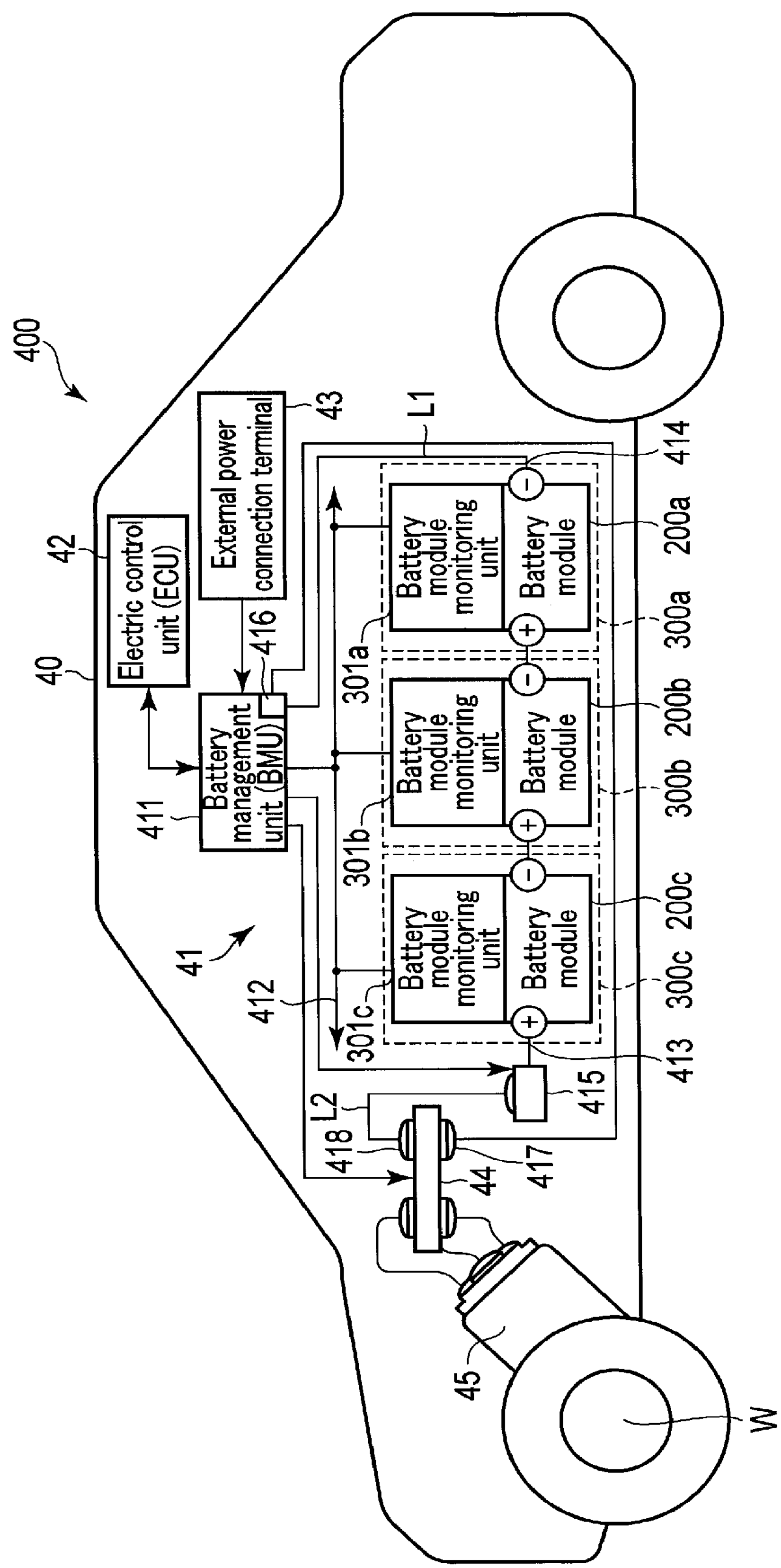
FIG. 10 is a view that schematically illustrates an example of a control system related to an electric system in the vehicle according to the fifth embodiment.

Next, with reference to FIG. 10, an aspect of operation of the vehicle according to the fifth embodiment is explained.

FIG. 10 is a view that schematically illustrates an example of a control system related to an electric system in the vehicle according to the fifth embodiment. A vehicle 400, shown in FIG. 10, is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300*a*, 300*b* and 300*c*, a battery management unit (BMU) 411, and a communication bus 412.

The battery pack 300*a* includes a battery module 200*a* and a battery module monitoring unit (for example, VTM: voltage temperature monitoring) 301*a*. The battery pack 300*b* includes a battery module 200*b*, and a battery module monitoring unit 301*b*. The battery pack 300*c* includes a battery module 200*c*, and a battery module monitoring unit 301*c*. The battery packs 300*a* to 300*c* are battery packs similar to the above-described battery pack 300, and battery modules 200*a* to 200*c* are battery modules similar to the above-described battery module 200. The battery modules 200*a* to 200*c* are electrically connected in series. The battery packs 300*a*, 300*b* and 300*c* can each be independently removed, and may be exchanged by a different battery pack 300.

Each of the battery modules 200*a* to 200*c* includes plural single-batteries connected in series. At least one of the plural single-batteries is the secondary battery according to the second embodiment. The battery modules 200*a* to 200*c* each perform charging and discharging via a positive electrode terminal 413 and a negative electrode terminal 414.

The battery management unit 411 communicates with the battery module monitoring units 301*a* to 301*c* so as to collect information that is related to voltages, temperatures and the like of the respective single-batteries 100 included in the battery modules 200*a* to 200*c* which are included in the vehicle power source 41. Thereby, the battery management unit 411 can collect information that is related to maintenance of the vehicle power source 41.

The battery management unit 411 is connected to the battery module monitoring units 301*a* to 301*c* via the communication bus 412. In the communication bus 412, a set of communication lines is shared by plural nodes (with the battery management unit 411 and one or more of the battery module monitoring units 301*a* to 301*c*). The communication bus 412 is a communication bus structured according to, for example, a CAN (Control Area Network) standard.

The battery module monitoring units 301*a* to 301*c* measure a voltage and a temperature of each single-battery in the battery modules 200*a* to 200*c* based on commands from the battery management unit 411. It is possible, however, to measure the temperatures only at several points per battery module, and the temperatures of all of the single-batteries need not be measured.

The vehicle power source 41 can have an electromagnetic contactor (for example, a switch unit 415 shown in FIG. 10) which switches ON and OFF electrical connection between the positive electrode terminal 413 and the negative electrode terminal 414. The switch unit 415 includes: a precharge switch (not illustrated) which is turned on when the battery modules 200*a* to 200*c* are charged; and a main switch (not illustrated) which is turned on when battery output from the battery modules 200*a* to 200*c* is supplied to a load. Each of the precharge switch and the main switch includes a relay circuit (not illustrated), which is turned ON or OFF by a signal supplied to a coil that is disposed near a switch element. The electromagnetic contactor such as the switch unit 415 is controlled based on a control signal from the battery management unit 411 or a vehicle ECU 42 which controls operations of the entire vehicle 400.

The inverter 44 converts an input direct current voltage into a high voltage of a three-phase alternating current (AC) for driving the motor. A three-phase output terminal of the inverter 44 is connected to each three-phase input terminal of the driving motor 45. The inverter 44 is controlled based on the control signal from the battery management unit 411 or the vehicle ECU 42 for controlling the operations of the entire vehicle. By the control of the inverter 44, the output voltage from the inverter 44 is adjusted.

The driving motor 45 is rotated by electric power supplied from the inverter 44. Driving force generated by the rotation of the driving motor 45 is transmitted via, for example, a differential gear unit to an axle and driving wheels W.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

To the negative electrode terminal 414 of the vehicle power source 41, one of terminals of a connection line L1 is connected. Other terminal of the connection line L1 is connected to a negative electrode input terminal 417 of the inverter 44. The connection line L1 is provided with a current detecting unit (current detecting circuit) 416 in the battery management unit 411 between the negative electrode terminal 414 and the negative electrode input terminal 417.

To the positive electrode terminal 413 of the vehicle power source 41, one of terminals of a connection line L2 is connected. Other terminal of the connection line L2 is connected to a positive electrode input terminal 418 of the inverter 44. The connection line L2 is provided with the switch apparatus 415 between the positive electrode terminal 413 and the positive electrode input terminal 418.

The external terminal 43 is connected to the battery management unit 411. The external terminal 43 is able to connect, for example, to an external power source.

The vehicle ECU 42 controls the vehicle power source 41, the switch unit 415, the inverter 44 and the like cooperatively with other management units and control units including the battery management unit 411, by responding to operation inputs by a driver and the like. By the cooperative control by the vehicle ECU 42 and the like, output of electric power from the vehicle power source 41, charge of the vehicle power source 41 and the like are controlled, whereby the entire vehicle 400 can be managed. Between the battery management unit 411 and the vehicle ECU 42, data related to the maintenance of the vehicle power source 41 such as a remaining capacity of the vehicle power source 41 is transferred via the communication line.

The vehicle according to the fifth embodiment is equipped with the battery pack according to the fourth embodiment. Thus, the vehicle according to the fifth embodiment is superior in both of travelling distance and travelling performance.

EXAMPLES

Example 1

Firstly, an active material, a conductive agent, a binder and solvent were mixed so as to prepare first slurry. As the active material, powder of lithium-cobalt-nickel-manganese composite oxide ($LiNi_{0.5}Co_{0.2}Mn_{0.3}O_2$) was used. As the conductive agent, acetylene black was used. As the binder, PVdF was used. As the solvent, NMP was used. A mass ratio of the active material, the conductive agent and the binder was 90:5:5.

Next, an active material, a solid electrolyte, a conductive agent, a binder and solvent were mixed so as to prepare second slurry. As the solid electrolyte, powder of garnet-type lithium lanthanum zirconium-containing oxide ($Li_7La_3Zr_2O_{12}$) was used. As the active material, the conductive agent, the binder and the solvent, an active material, a conductive agent, a binder and solvent that were similar to those of the first slurry were used. A mass ratio of the active material, the solid electrolyte, the conductive agent and the binder was 80:10:5:5.

The first slurry and the second slurry were applied onto a current collector simultaneously so as to be laminated in this order, and were dried, thereby obtaining a laminate. As the current collector, aluminum foil with a thickness of 15 μm was used. An application amount of the first slurry per unit area was 105 $g/m^2$. An application amount of the second slurry per unit area was 45 $g/m^2$.

The laminate was subjected to press treatment, and was cut into a predetermined size. Thereafter, the cut laminate was further dried in vacuum, thereby obtaining an electrode. Density of the electrode (excluding the current collector) was 3.0 $g/cm^3$.

Example 2

Except for using $LiNi_{0.6}Co_{0.2}Mn_{0.2}O_2$ instead of the $LiNi_{0.5}Co_{0.2}Mn_{0.3}O_2$ as a lithium-cobalt-nickel-manganese composite oxide, an electrode was produced similarly to Example 1.

Example 3

Except for using $LiNi_{0.8}Co_{0.1}Mn_{0.1}O_2$ instead of the $LiNi_{0.5}Co_{0.2}Mn_{0.2}O_2$ as a lithium-cobalt-nickel-manganese composite oxide, an electrode was produced similarly to Example 1.

Example 4

Except for using $LiNi_{0.3}Co_{0.4}Mn_{0.3}O_2$ instead of the $LiNi_{0.5}Co_{0.2}Mn_{0.2}O_2$ as a lithium-cobalt-nickel-manganese composite oxide, an electrode was produced similarly to Example 1.

Example 5

Except for using lithium-cobalt composite oxide $LiCoO_2$ instead of the lithium-cobalt-nickel-manganese composite oxide $LiNi_{0.5}Co_{0.2}Mn_{0.2}O_2$ as an active material, an electrode was produced similarly to Example 1.

Example 6

Except for using lithium-aluminum-manganese composite oxide $LiAl_{0.1}Mn_{1.9}O_4$ instead of the lithium-cobalt-nickel-manganese composite oxide $LiNi_{0.5}Co_{0.2}Mn_{0.3}O_2$ as an active material and setting an electrode density to be 2.6 $g/cm^3$, an electrode was produced similarly to Example 1.

Example 7

Except for using lithium-nickel-manganese composite oxide $LiNi_{0.5}Mn_{1.5}O_4$ instead of the lithium-cobalt-nickel-manganese composite oxide $LiNi_{0.5}Co_{0.2}Mn_{0.3}O_2$ as an active material and setting electrode density to be 2.6 $g/cm^3$, an electrode was produced similarly to Example 1.

Example 8

Except for using a mixture of lithium-cobalt-nickel-manganese composite oxide $LiNi_{0.5}Co_{0.2}Mn_{0.3}O_2$ and lithium-cobalt composite oxide $LiCoO_2$ instead of the lithium-cobalt-nickel-manganese composite oxide $LiNi_{0.5}Co_{0.2}Mn_{0.3}O_2$ as an active material, an electrode was produced similarly to Example 1.

Incidentally, a mass ratio of $LiNi_{0.5}Co_{0.2}Mn_{0.3}O_2$, $LiCoO_2$, a conductive agent and a binder in first slurry was 45:45:5:5. Further, a mass ratio of $LiNi_{0.5}Co_{0.2}Mn_{0.3}O_2$, $LiCoO_2$, a solid electrolyte, a conductive agent and a binder in the second slurry was 40:40:10:5:5.

Example 9

Except for using lithium-aluminum-manganese composite oxide $LiAl_{0.1}Mn_{1.9}O_4$ instead of the lithium-cobalt composite oxide $LiCoO_2$ and setting electrode density to be 2.8 $g/cm^3$, an electrode was produced similarly to Example 8.

Example 10

Except for using lithium-manganese-iron-magnesium composite oxide $LiMn_{0.8}Fe_{0.15}Mg_{0.05}PO_4$ instead of the lithium-cobalt composite oxide $LiCoO_2$ and setting electrode density to be 2.6 $g/cm^3$, an electrode was produced similarly to Example 8.

Example 11

Except for changing a mass ratio of $LiNi_{0.5}Co_{0.2}Mn_{0.3}O_2$, $LiCoO_2$, a conductive agent and a binder in first slurry into 80:10:5:5, and changing a mass ratio of $LiNi_{0.5}Co_{0.2}Mn_{0.3}O_2$, $LiCoO_2$, a solid electrolyte, a conductive agent and a binder in second slurry into 72:8:10:5:5, an electrode was produced similarly to Example 8.

Example 12

Except for using garnet-type lithium aluminum lanthanum zirconium-containing oxide ($Li_{6.25}Al_{0.25}La_3Zr_2O_{12}$) instead of the garnet-type lithium lanthanum zirconium-containing oxide ($Li_7La_3Zr_2O_{12}$) as a solid electrolyte, an electrode was produced similarly to Example 1.

Example 13

Except for using NASICON-type lithium aluminum titanium-containing oxide ($Li_{1.3}Al_{0.3}Ti_{1.7}(PO_4)_3$) instead of the garnet-type lithium lanthanum zirconium-containing oxide ($Li_7La_3Zr_2O_{12}$) as a solid electrolyte, an electrode was produced similarly to Example 1.

Example 14

Except for using NASICON-type lithium zirconium calcium-containing oxide ($Li_{1.2}Zr_{1.9}Ca_{0.1}(PO_4)_3$) instead of the garnet-type lithium lanthanum zirconium-containing oxide ($Li_7La_3Zr_2O_{12}$) as a solid electrolyte, an electrode was produced similarly to Example 1.

Example 15

Except for using perovskite-type lithium lanthanum titanium-containing oxide ($Li_{0.35}La_{0.55}TiO_3$) instead of the garnet-type lithium lanthanum zirconium-containing oxide ($Li_7La_3Zr_2O_{12}$) as a solid electrolyte, an electrode was produced similarly to Example 1.

Example 16

Except for setting an application amount of first slurry to be 120 $g/m^2$ and setting an application amount of second slurry to be 30 $g/m^2$, an electrode was produced similarly to Example 1.

Example 17

Except for setting an application amount of first slurry to be 135 $g/m^2$ and setting an application amount of second slurry to be 15 $g/m^2$, an electrode was produced similarly to Example 1.

Comparative Example 1

Except for setting an application amount of first slurry to be 45 $g/m^2$ and setting an application amount of second slurry to be 105 $g/m^2$, an electrode was produced similarly to Example 1.

Comparative Example 2

Except for setting an application amount of first slurry to be 75 $g/m^2$ and setting an application amount of second slurry to be 75 $g/m^2$, an electrode was produced similarly to Example 1.

Comparative Example 3

Except for using the second slurry as first slurry, and using the first slurry as second slurry, an electrode was produced similarly to Example 1.

Comparative Example 4

Except for using lithium-aluminum-manganese composite oxide $LiAl_{0.1}Mn_{1.9}O_4$ instead of the lithium-cobalt-nickel-manganese composite oxide $LiNi_{0.5}Co_{0.2}Mn_{0.3}O_2$ as an active material and setting electrode density to be 2.6 $g/cm^3$, an electrode was produced similarly to Comparative Example 3.

Comparative Example 5

Except for using the first slurry as second slurry, an electrode was produced similarly to Example 1.

Comparative Example 6

Except for setting an application amount of first slurry to be 150 $g/m^2$ and omitting the application of the second slurry, an electrode was produced similarly to Example 1.

Comparative Example 7

Firstly, after dissolving a binder into solvent, a conductive agent was dispersed therein so as to prepare dispersion liquid. As the solvent, NMP was used. As the binder, PVdF was used. As the conductive agent, acetylene black was used.

Into this dispersion liquid, an active material and a solid electrolyte was mixed, thereby obtaining mixed solution. As the active material, powder of lithium-nickel-cobalt-manganese composite oxide ($LiNi_{0.5}Co_{0.2}Mn_{0.3}O_2$) was used. As the solid electrolyte, powder of garnet-type lithium lanthanum zirconium-containing oxide ($Li_7La_3Zr_2O_{12}$) was used. To this mixed solution, solvent was further added, thereby obtaining slurry for forming an electrode. Solid content concentration in the slurry was 60% by mass. In the slurry, a mass ratio of the active material, the solid electrolyte, the conductive agent and the binder was 100:10:5:3.

After applying this slurry onto a current collector, the current collector provided with a coating film was introduced into a drying furnace so that the coating film is on top. In an initial zone in the drying furnace, rapid drying was performed at a temperature of 150° C. for one minute. By this rapid drying, movement (migration) of solid electrolyte particles toward a surface side in the coating film on the current collector was caused. In a remaining zone in the drying furnace, drying was performed at 130° C. for 2 minutes. The current collector provided with the dried coating film was subjected to press treatment, thereby obtaining an electrode. Electrode density thereof (excluding the current collector) was 3.0 $g/cm^3$. In this electrode, a volume ratio of the solid electrolyte particles was gradually decreased along a thickness direction of an active material-containing layer. Further, at least a part of a surface of the active material-containing layer was structured by the solid electrolyte particles.

Example 18

Except for using lithium-titanium composite oxide ($Li_4Ti_5O_{12}$) instead of the lithium-cobalt-nickel-manganese composite oxide $LiNi_{0.5}Co_{0.2}Mn_{0.3}O_2$ as an active material and setting electrode density to be 2.0 g/cm$^3$, an electrode was produced similarly to Example 1.

Example 19

Except for using titanium oxide ($TiO_2$(B)) instead of the lithium-titanium composite oxide ($Li_4Ti_5O_{12}$) as an active material, an electrode was produced similarly to Example 18.

Example 20

Except for using niobium-titanium composite oxide ($TiNb_2O_7$) instead of the lithium-titanium composite oxide ($Li_4Ti_5O_{12}$) as an active material and setting electrode density to be 2.5 g/cm$^3$, an electrode was produced similarly to Example 18.

Example 21

Except for using iron-containing niobium-titanium composite oxide ($TiNb_{1.95}Fe_{0.05}O_7$) instead of the lithium-titanium composite oxide ($Li_4Ti_5O_{12}$) as an active material and setting electrode density to be 2.5 g/cm$^3$, an electrode was produced similarly to Example 18.

Example 22

Except for using tantalum-containing niobium-titanium composite oxide ($TiNb_{1.95}Ta_{0.05}O_7$) instead of the lithium-titanium composite oxide ($Li_4Ti_5O_{12}$) as an active material and setting electrode density to be 2.5 g/cm$^3$, an electrode was produced similarly to Example 18.

Example 23

Except for using molybdenum-containing niobium-titanium composite oxide ($TiNb_{1.95}Mo_{0.05}O_7$) instead of the lithium-titanium composite oxide ($Li_4Ti_5O_{12}$) as an active material and setting electrode density to be 2.5 g/cm$^3$, an electrode was produced similarly to Example 18.

Example 24

Except for using sodium-containing lithium-titanium composite oxide ($Li_2Na_2Ti_6O_{14}$) instead of the lithium-titanium composite oxide ($Li_4Ti_5O_{12}$) as an active material and setting electrode density to be 2.2 g/cm$^3$, an electrode was produced similarly to Example 18.

Example 25

Except for using sodium-containing lithium-niobium-titanium composite oxide ($Li_2Na_{1.8}Ti_{5.8}Nb_{0.2}O_{14}$) instead of the lithium-titanium composite oxide ($Li_4Ti_5O_{12}$) as an active material and setting electrode density to be 2.2 g/cm$^3$, an electrode was produced similarly to Example 18.

Example 26

Except for using graphite instead of the lithium-titanium composite oxide ($Li_4Ti_5O_{12}$) as an active material and setting electrode density to be 1.2 g/cm$^3$, an electrode was produced similarly to Example 18.

Example 27

Except for using a mixture of graphite and silicon composite oxide (SiO) instead of the lithium-titanium composite oxide ($Li_4Ti_5O_{12}$) as an active material and setting electrode density to be 1.2 g/cm$^3$, an electrode was produced similarly to Example 18.

Incidentally, a mass ratio of the graphite, SiO, a conductive agent and a binder in first slurry was 80:10:5:5. Further, a mass ratio of the graphite, SiO, a solid electrolyte, a conductive agent and a binder in second slurry was 72:8:10:5:5.

Example 28

Except for using garnet-type lithium aluminum lanthanum zirconium-containing oxide ($Li_{6.25}Al_{0.25}La_3Zr_2O_{12}$) instead of the garnet-type lithium lanthanum zirconium-containing oxide ($Li_7La_3Zr_2O_{12}$) as a solid electrolyte, an electrode was produced similarly to Example 18.

Example 29

Except for using NASICON-type lithium aluminum titanium-containing oxide ($Li_{1.3}Al_{0.3}Ti_{1.7}(PO_4)_3$) instead of the garnet-type lithium lanthanum zirconium-containing oxide ($Li_7La_3Zr_2O_{12}$) as a solid electrolyte, an electrode was produced similarly to Example 18.

Example 30

Except for using NASICON-type lithium zirconium calcium-containing oxide ($Li_{1.2}Zr_{1.9}Ca_{0.1}(PO_4)_3$) instead of the garnet-type lithium lanthanum zirconium-containing oxide ($Li_7La_3Zr_2O_{12}$) as a solid electrolyte, an electrode was produced similarly to Example 18.

Example 31

Except for using perovskite-type lithium lanthanum titanium-containing oxide ($Li_{0.35}La_{0.55}TiO_3$) instead of the garnet-type lithium lanthanum zirconium-containing oxide ($Li_7La_3Zr_2O_{12}$) as a solid electrolyte, an electrode was produced similarly to Example 18.

Example 32

Except for using a mixture of lithium-titanium composite oxide ($Li_4Ti_5O_{12}$) and titanium oxide ($TiO_2$(B)) instead of the lithium-titanium composite oxide ($Li_4Ti_5O_{12}$) as an active material, an electrode was produced similarly to Example 18.

Incidentally, a mass ratio of $Li_4Ti_5O_{12}$, $TiO_2$(B), a conductive agent and a binder in first slurry was 45:45:5:5. Further, a mass ratio of $Li_4Ti_5O_{12}$, $TiO_2$(B), a solid electrolyte, a conductive agent and a binder in second slurry was 40:40:10:5:5.

Example 33

Except for using niobium-titanium composite oxide ($TiNb_2O_7$) instead of the titanium oxide ($TiO_2$ (B)) as an active material and setting electrode density to be 2.3 g/cm$^3$, an electrode was produced similarly to Example 32.

Example 34

Except for using sodium-containing lithium-niobium-titanium composite oxide ($Li_2Na_{1.8}Ti_{5.8}Nb_{0.2}O_{3.4}$) instead of the titanium oxide ($TiO_2$(B)) as an active material and setting electrode density to be 2.1 g/cm$^3$, an electrode was produced similarly to Example 32.

Example 35

Except for using sodium-containing lithium-niobium-titanium composite oxide ($Li_2Na_{1.8}Ti_{5.8}Nb_{0.2}O_{14}$) instead of the titanium oxide ($TiO_2$(B)) as an active material and setting electrode density to be 2.1 g/cm$^3$, an electrode was produced similarly to Example 32.

Incidentally, a mass ratio of $Li_4Ti_5O_{12}$, $Li_2Na_{1.8}Ti_{5.8}Nb_{0.2}O_{14}$, a conductive agent and a binder in first slurry was 80:10:5:5. Further, a mass ratio of $Li_4Ti_5O_{12}$, $Li_2Na_{1.8}Ti_{5.8}Nb_{0.2}O_{14}$, a solid electrolyte, a conductive agent and a binder in second slurry was 71:8:10:5:5.

Example 36

Except for setting an application amount of first slurry to be 120 g/m$^2$ and setting an application amount of second slurry to be 30 g/m$^2$, an electrode was produced similarly to Example 18.

Example 37

Except for setting an application amount of first slurry to be 135 g/m$^2$ and setting an application amount of second slurry to be 15 g/m$^2$, an electrode was produced similarly to Example 18.

Comparative Example 8

Except for setting an application amount of first slurry to be 45 g/m$^2$ and setting an application amount of second slurry to be 105 g/m$^2$, an electrode was produced similarly to Example 18.

Comparative Example 9

Except for using the second slurry as first slurry, and using the first slurry as second slurry, an electrode was produced similarly to Example 18.

Comparative Example 10

Except for using niobium-titanium composite oxide ($TiNb_2O_7$) instead of the lithium-titanium composite oxide ($Li_4Ti_5O_{12}$) as an active material and setting electrode density to be 2.5 g/cm$^3$, an electrode was produced similarly to Comparative Example 9.

Comparative Example 11

Except for using the first slurry as second slurry, an electrode was produced similarly to Example 18.

Comparative Example 12

Except for setting an application amount of first slurry to be 150 g/m$^2$ and omitting the application of second slurry, an electrode was produced similarly to Example 18.

Comparative Example 13

Except for using lithium-titanium composite oxide ($Li_4Ti_5O_{12}$) instead of the lithium-cobalt-nickel-manganese composite oxide $LiNi_{0.5}Co_{0.2}Mn_{0.3}O_2$ as an active material and setting electrode density to be 2.0 g/cm$^3$, an electrode was produced similarly to Comparative Example 7. In this electrode, a volume ratio of solid electrolyte particles was gradually decreased along a thickness direction of an active material-containing layer. Further, at least a part of a surface of an active material-containing layer was structured by the solid electrolyte particles.

Example 38

A nonaqueous electrolyte battery shown in FIGS. 2 and 3 was obtained by a following method.

Firstly, a positive electrode, a first separator, a negative electrode and a second separator were laminated in this order, thereby obtaining a laminate. This laminate was wound into a spiral shape, and was thereafter subjected to press treatment at a temperature of 90° C., thereby producing a flat electrode group. A width of the flat electrode group was 30 mm, and a thickness thereof was 3.0 mm. As the positive electrode, the electrode obtained in Example 1 was used. As the negative electrode, the electrode obtained in Example 18 was used. As the first and second separators, a polyethylene porous film having a thickness of 25 μm was used.

Subsequently, the flat electrode group was stored into a pack that was made of a laminate film, and was thereafter dried in vacuum at a temperature of 80° C. for 24 hours. The laminate film was structured by forming polypropylene layers on both surfaces of an aluminum foil that had a thickness of 40 μm, and a total thickness thereof was 0.1 mm.

After pouring a liquid nonaqueous electrolyte into the pack of the laminate film after the vacuum dry, the pack was sealed completely by heat sealing. As the liquid nonaqueous electrolyte, solution obtained by dissolving an electrolyte into mixed solvent to provide concentration of the electrolyte to be 1 M was used. As the mixed solvent, a mixture of propylene carbonate (PC) and diethyl carbonate (DEC) by 1:1 in volume ratio was used. As the electrolyte, $LiPF_6$ was used.

In this way, the nonaqueous electrolyte battery shown in FIGS. 2 and 3 was obtained. A width of the nonaqueous electrolyte battery was 35 mm, a thickness thereof was 3.2 mm, and a height thereof was 65 mm. A capacity of the nonaqueous electrolyte battery was 500 mAh.

Example 39

Except for using the electrode obtained in Comparative Example 12 as a negative electrode, a nonaqueous electrolyte battery was produced by a method similar to that described in Example 38.

Example 40

Except for using the electrode obtained in Comparative Example 6 as a positive electrode, a nonaqueous electrolyte battery was produced by a method similar to that described in Example 38.

Example 41

Except for using the electrode obtained in Example 8 as a positive electrode, a nonaqueous electrolyte battery was produced by a method similar to that described in Example 38.

Example 42

Except for using the electrode obtained in Example 32 as a negative electrode, a nonaqueous electrolyte battery was produced by a method similar to that described in Example 38.

Comparative Example 14

Except for using the electrode obtained in Comparative Example 6 as a positive electrode and using the electrode obtained in Comparative Example 12 as a negative electrode, a nonaqueous electrolyte battery was produced by a method similar to that described in Example 38.

Comparative Example 15

Except for using the electrode obtained in Comparative Example 3 as a positive electrode and using the electrode obtained in Comparative Example 12 as a negative electrode, a nonaqueous electrolyte battery was produced by a method similar to that described in Example 38.

Comparative Example 16

Except for using the electrode obtained in Comparative Example 6 as a positive electrode and using the electrode obtained in Comparative Example 9 as a negative electrode, a nonaqueous electrolyte battery was produced by a method similar to that described in Example 38.

<Various Measurements>

By the above-described methods, a thickness T of an active material-containing layer, a length L1 of a first active material portion, a length L2 of a second active material portion, a ratio L1/T, a content E1 of solid electrolyte particles per unit area in the first active material portion, a content E2 of solid electrolyte particles per unit area in the second active material portion, a content E3 of active material particles per unit area in the first active material portion, a content E4 of active material particles per unit area in the second active material portion, a ratio E1/E2 and uniformity were calculated.

Incidentally, in Comparative Examples 7 and 13, a content of the solid electrolyte particles per unit area in a cross-section, which was obtained by cutting a part of the active material-containing layer with a thickness of 5 μm from a deepest face and was parallel to the deepest face, is denoted by the content E1. Further, a content of the solid electrolyte particles per unit area in a cross-section, which was obtained by cutting a part of the active material-containing layer with a thickness of 5 μm from an outermost face and was parallel to the outermost face, is denoted by the content E2.

Results of them will be shown in Tables 3 and 4.

<Rate Performances>

Rate performances were evaluated using each of the electrodes obtained in Examples 1 to 37 and Comparative Examples 1 to 13. More specifically, a three-electrode cell was firstly produced. As a working electrode of the three-electrode cell, each of the electrodes obtained in Examples 1 to 37 and Comparative Examples 1 to 13 was used. As a counter electrode and a reference electrode of the three-electrode cell, lithium metal was used. As a nonaqueous electrolyte, solution obtained by dissolving $LiPF_6$ into mixed solvent of ethylene carbonate (EC) and diethyl carbonate (DEC) was used. A volume ratio of EC and DEC in the mixed solvent was 1:2. Concentration of $LiPF_6$ was 1.0 mol/L.

Subsequently, constant voltage and constant current charge was performed at a temperature of 25° C. Each of the cells according to Examples 1 to 6 and 8 to 17 and Comparative Examples 1 to 7 was charged until reaching 4.3 V at a current value of 1 C, and the cell of Example 7 was charged until reaching a voltage of 4.9 V at a current value of 1 C, and then each cell was subjected to constant voltage charge until reaching a current value of 0.05 C at each predetermined voltage. Each of the cells according to Examples 18 to 25 and 28 to 37 was charged until reaching 1.0 V at a current value of 1 C, and each of the cells according to Examples 26 and 27 was charged until reaching a voltage of 0.05 V at a current value of 1 C, and then each cell was subjected to constant voltage charge until reaching a current value of 0.05 C at each predetermined voltage. After the charge, each of the cells according to Examples 1 to 17 and Comparative Examples 1 to 7 was discharged at a current value of 0.2 C until reaching 3.2 V, and each of the cells according to Examples 18 to 37 and Comparative Examples 8 to 13 was discharged at a current value of 0.2 C until reaching 3.0 V. A discharge capacity obtained at this time was denoted by a discharge capacity W1.

Subsequently, each of the cells according to Examples 1 to 6 and 8 to 17 and Comparative Examples 1 to 7 was charged at a current value of 1 C until reaching 4.3 V, and the cell of Example 7 was charged at a current value of 1 C until reaching a voltage of 4.9 V, and then each cell was subjected to constant voltage charge until reaching a current value of 0.05 C at each predetermined voltage. Each of the cells according to Examples 18 to 25 and 28 to 37 and Comparative Examples 8 to 13 was charged at a current value of 1 C until reaching 1.0 V, each of the cells according to Examples 26 and 17 was charged at a current value of 1 C until reaching a voltage of 0.05 V, and the each cell was charged again at each predetermined voltage until reaching a current value of 0.05 C. After the charge, each of the cells according to Examples 1 to 17 and Comparative Examples 1 to 7 was discharged at a current value of 10 C until reaching 3.2 V, and each of the cells according to Examples 18 to 37 and Comparative Examples 8 to 13 was discharged at a current value of 10 C until reaching 3.0 V. A discharge capacity obtained at this time was denoted by a discharge capacity W2.

By dividing the discharge capacity W2 by the discharge capacity W1, a discharge capacity rate W2/W1 was obtained.

Each of the nonaqueous electrolyte batteries obtained in Examples 38 to 42 and Comparative Examples 14 and 15 was evaluated by a similar method at a temperature of 25° C. The charge was constant voltage and constant current charge, in which constant current charge was performed at a current value of 1 C until reaching 2.8 V, and after reaching 2.8 V, constant voltage charge was continued until the current value reached 0.05 C. The discharge was constant current discharge, which was performed at 0.2 C or 10 C at a temperature of 25° C. The discharge was continued until a cell voltage reached 1.5 V. From the thus obtained values, each discharge capacity rate W2/W1 was calculated.

Results of them will be shown in Tables 3, 4 and 5.

<Energy Density Measurement>

A capacity per weight of the active material-containing layer of each of the electrodes obtained in Examples 1 to 37 and Comparative Examples 1 to 13 during the above-described 0.2 C charge was denoted by energy density (mAh/g). It can be realized that, from Tables 3 and 4 below, if comparing the electrodes using the same active material to each other, the energy density of the electrodes of the examples was higher than those of the comparative examples. This is because the amount and existing positions of the solid electrolyte particles were optimized, and this shows that the electrodes of the examples exhibited both of the high energy density and the high rate performances without containing an excessive amount of the solid electrolyte particles in the electrode layer.

This result will be shown in Tables 3 and 4.

Methods for manufacturing the electrodes according to the examples and the comparative examples will be listed below in Tables 1 and 2.

TABLE 1

| | First Active Material | Second Active Material | Solid Electrolyte | First Mass Ratio | Second Mass Ratio | First Application Amount ($g/m^2$) | Second Application Amount ($g/m^2$) |
|---|---|---|---|---|---|---|---|
| Example 1 | $LiNi_{0.5}Co_{0.2}Mn_{0.3}O_2$ | — | $Li_7La_3Zr_2O_{12}$ | 90:0:0:5:5 | 80:0:10:5:5 | 105 | 45 |
| Example 2 | $LiNi_{0.6}Co_{0.2}Mn_{0.2}O_2$ | — | $Li_7La_3Zr_2O_{12}$ | 90:0:0:5:5 | 80:0:10:5:5 | 105 | 45 |
| Example 3 | $LiNi_{0.8}Co_{0.1}Mn_{0.1}O_2$ | — | $Li_7La_3Zr_2O_{12}$ | 90:0:0:5:5 | 80:0:10:5:5 | 105 | 45 |
| Example 4 | $LiNi_{0.3}Co_{0.4}Mn_{0.3}O_2$ | — | $Li_7La_3Zr_2O_{12}$ | 90:0:0:5:5 | 80:0:10:5:5 | 105 | 45 |
| Example 5 | $LiCoO_2$ | — | $Li_7La_3Zr_2O_{12}$ | 90:0:0:5:5 | 80:0:10:5:5 | 105 | 45 |
| Example 6 | $LiAl_{0.1}Mn_{1.9}O_4$ | — | $Li_7La_3Zr_2O_{12}$ | 90:0:0:5:5 | 80:0:10:5:5 | 105 | 45 |
| Example 7 | $LiNi_{0.5}Mn_{1.5}O_4$ | — | $Li_7La_3Zr_2O_{12}$ | 90:0:0:5:5 | 80:0:10:5:5 | 105 | 45 |
| Example 8 | $LiNi_{0.5}Co_{0.2}Mn_{0.3}O_2$ | $LiCoO_2$ | $Li_7La_3Zr_2O_{12}$ | 45:45:0:5:5 | 40:40:10:5:5 | 105 | 45 |
| Example 9 | $LiNi_{0.5}Co_{0.2}Mn_{0.3}O_2$ | $LiAl_{0.1}Mn_{1.9}O_4$ | $Li_7La_3Zr_2O_{12}$ | 45:45:0:5:5 | 40:40:10:5:5 | 105 | 45 |
| Example 10 | $LiNi_{0.5}Co_{0.2}Mn_{0.3}O_2$ | $LiMn_{0.8}Fe_{0.15}Mg_{0.05}PO_4$ | $Li_7La_3Zr_2O_{12}$ | 45:45:0:5:5 | 40:40:10:5:5 | 105 | 45 |
| Example 11 | $LiNi_{0.5}Co_{0.2}Mn_{0.3}O_2$ | $LiCoO_2$ | $Li_7La_3Zr_2O_{12}$ | 80:10:0:5:5 | 72:8:10:5:5 | 105 | 45 |
| Example 12 | $LiNi_{0.5}Co_{0.2}Mn_{0.3}O_2$ | — | $Li_{6.25}Al_{0.25}La_3Zr_2O_{12}$ | 90:0:0:5:5 | 80:0:10:5:5 | 105 | 45 |
| Example 13 | $LiNi_{0.5}Co_{0.2}Mn_{0.3}O_2$ | — | $Li_{1.3}Al_{0.3}Ti_{1.7}(PO_4)_3$ | 90:0:0:5:5 | 80:0:10:5:5 | 105 | 45 |
| Example 14 | $LiNi_{0.5}Co_{0.2}Mn_{0.3}O_2$ | — | $Li_{1.2}Zr_{1.9}Ca_{0.1}(PO_4)_3$ | 90:0:0:5:5 | 80:0:10:5:5 | 105 | 45 |
| Example 15 | $LiNi_{0.5}Co_{0.2}Mn_{0.3}O_2$ | — | $Li_{0.35}La_{0.55}TiO_3$ | 90:0:0:5:5 | 80:0:10:5:5 | 105 | 45 |
| Example 16 | $LiNi_{0.5}Co_{0.2}Mn_{0.3}O_2$ | — | $Li_7La_3Zr_2O_{12}$ | 90:0:0:5:5 | 80:0:10:5:5 | 120 | 30 |
| Example 17 | $LiNi_{0.5}Co_{0.2}Mn_{0.3}O_2$ | — | $Li_7La_3Zr_2O_{12}$ | 90:0:0:5:5 | 80:0:10:5:5 | 135 | 15 |
| Comp. Example 1 | $LiNi_{0.5}Co_{0.2}Mn_{0.3}O_2$ | — | $Li_7La_3Zr_2O_{12}$ | 90:0:0:5:5 | 80:0:10:5:5 | 45 | 105 |
| Comp. Example 2 | $LiNi_{0.5}Co_{0.2}Mn_{0.3}O_2$ | — | $Li_7La_3Zr_2O_{12}$ | 90:0:0:5:5 | 80:0:10:5:5 | 75 | 75 |
| Comp. Example 3 | $LiNi_{0.5}Co_{0.2}Mn_{0.3}O_2$ | | $Li_7La_3Zr_2O_{12}$ | 80:0:10:5:5 | 90:0:0:5:5 | 105 | 45 |
| Comp. Example 4 | $LiAl_{0.1}Mn_{1.9}O_4$ | — | $Li_7La_3Zr_2O_{12}$ | 80:0:10:5:5 | 90:0:0:5:5 | 105 | 45 |
| Comp. Example 5 | $LiNi_{0.5}Co_{0.2}Mn_{0.3}O_2$ | — | — | 90:0:0:5:5 | 90:0:0:5:5 | 105 | 45 |
| Comp. Example 6 | $LiNi_{0.5}Co_{0.2}Mn_{0.3}O_2$ | — | — | 90:0:0:5:5 | — | 150 | — |
| Comp. Example 7 | $LiNi_{0.5}Co_{0.2}Mn_{0.3}O_2$ | — | $Li_7La_3Zr_2O_{12}$ | 100:0:10:5:3 | — | 150 | — |

TABLE 2

| | First Active Material | Second Active Material | Solid Electrolyte | First Mass Ratio | Second Mass Ratio | First Application Amount ($g/m^2$) | Second Application Amount ($g/m^2$) |
|---|---|---|---|---|---|---|---|
| Example 18 | $Li_4Ti_5O_{12}$ | — | $Li_7La_3Zr_2O_{12}$ | 90:0:0:5:5 | 80:0:10:5:5 | 105 | 45 |
| Example 19 | $TiO_2$(B) | — | $Li_7La_3Zr_2O_{12}$ | 90:0:0:5:5 | 80:0:10:5:5 | 105 | 45 |
| Example 20 | $TiNb_2O_7$ | — | $Li_7La_3Zr_2O_{12}$ | 90:0:0:5:5 | 80:0:10:5:5 | 105 | 45 |
| Example 21 | $TiNb_{1.95}Fe_{0.05}O_7$ | — | $Li_7La_3Zr_2O_{12}$ | 90:0:0:5:5 | 80:0:10:5:5 | 105 | 45 |
| Example 22 | $TiNb_{1.95}Ta_{0.05}O_7$ | — | $Li_7La_3Zr_2O_{12}$ | 90:0:0:5:5 | 80:0:10:5:5 | 105 | 45 |
| Example 23 | $TiNb_{1.95}Mo_{0.05}O_7$ | — | $Li_7La_3Zr_2O_{12}$ | 90:0:0:5:5 | 80:0:10:5:5 | 105 | 45 |
| Example 24 | $Li_2Na_2Ti_6O_{14}$ | — | $Li_7La_3Zr_2O_{12}$ | 90:0:0:5:5 | 80:0:10:5:5 | 105 | 45 |
| Example 25 | $Li_2Na_{1.8}Ti_{5.8}Nb_{0.2}O_{14}$ | — | $Li_7La_3Zr_2O_{12}$ | 90:0:0:5:5 | 80:0:10:5:5 | 105 | 45 |
| Example 26 | Graphite | — | $Li_7La_3Zr_2O_{12}$ | 90:0:0:5:5 | 80:0:10:5:5 | 49 | 21 |
| Example 27 | Graphite | SiO | $Li_7La_3Zr_2O_{12}$ | 80:10:0:5:5 | 72:8:10:5:5 | 49 | 21 |
| Example 28 | $Li_4Ti_5O_{12}$ | — | $Li_{6.25}Al_{0.25}La_3Zr_2O_{12}$ | 90:0:0:5:5 | 80:0:10:5:5 | 105 | 45 |
| Example 29 | $Li_4Ti_5O_{12}$ | — | $Li_{1.3}Al_{0.3}Ti_{1.7}(PO_4)_3$ | 90:0:0:5:5 | 80:0:10:5:5 | 105 | 45 |
| Example 30 | $Li_4Ti_5O_{12}$ | — | $Li_{1.2}Zr_{1.9}Ca_{0.1}(PO_4)_3$ | 90:0:0:5:5 | 80:0:10:5:5 | 105 | 45 |
| Example 31 | $Li_4Ti_5O_{12}$ | — | $Li_{0.35}La_{0.55}TiO_3$ | 90:0:0:5:5 | 80:0:10:5:5 | 105 | 45 |
| Example 32 | $Li_4Ti_5O_{12}$ | $TiO_2$(B) | $Li_7La_3Zr_2O_{12}$ | 45:45:0:5:5 | 40:40:10:5:5 | 105 | 45 |
| Example 33 | $Li_4Ti_5O_{12}$ | $TiNb_2O_7$ | $Li_7La_3Zr_2O_{12}$ | 45:45:0:5:5 | 40:40:10:5:5 | 105 | 45 |
| Example 34 | $Li_4Ti_5O_{12}$ | $Li_2Na_{1.8}Ti_{5.8}Nb_{0.2}O_{14}$ | $Li_7La_3Zr_2O_{12}$ | 45:45:0:5:5 | 40:40:10:5:5 | 105 | 45 |
| Example 35 | $Li_4Ti_5O_{12}$ | $Li_2Na_{1.8}Ti_{5.8}Nb_{0.2}O_{14}$ | $Li_7La_3Zr_2O_{12}$ | 80:0:10:5:5 | 72:8:10:5:5 | 105 | 45 |
| Example 36 | $Li_4Ti_5O_{12}$ | — | $Li_7La_3Zr_2O_{12}$ | 90:0:0:5:5 | 80:0:10:5:5 | 120 | 30 |
| Example 37 | $Li_4Ti_5O_{12}$ | — | $Li_7La_3Zr_2O_{12}$ | 90:0:0:5:5 | 80:0:10:5:5 | 135 | 15 |
| Comp. Example 8 | $Li_4Ti_5O_{12}$ | — | $Li_7La_3Zr_2O_{12}$ | 90:0:0:5:5 | 80:0:10:5:5 | 45 | 105 |
| Comp. Example 9 | $Li_4Ti_5O_{12}$ | — | $Li_7La_3Zr_2O_{12}$ | 80:0:10:5:5 | 90:0:0:5:5 | 105 | 45 |
| Comp. Example 10 | $TiNb_2O_7$ | — | $Li_7La_3Zr_2O_{12}$ | 80:0:10:5:5 | 90:0:0:5:5 | 105 | 45 |
| Comp. Example 11 | $Li_4Ti_5O_{12}$ | — | — | 90:0:0:5:5 | 90:0:0:5:5 | 105 | 45 |
| Comp. Example 12 | $Li_4Ti_5O_{12}$ | — | — | 90:0:0:5:5 | — | 150 | — |
| Comp. Example 13 | $Li_4Ti_5O_{12}$ | — | $Li_7La_3Zr_2O_{12}$ | 100:0:10:5:3 | — | 150 | — |

In above Tables 1 and 2, each kind of the active material is described in the columns of "First Active Material" and "Second Active Material". In the column of "Solid Electrolyte", each kind of the solid electrolyte is described. In the column of "First Mass Ratio", each mass ratio of the first active material, the second active material, the solid electrolyte, the conductive agent and the binder in the first slurry is described. In the column of "Second Mass Ratio", each mass ratio of the first active material, the second active material, the solid electrolyte, the conductive agent and the binder in the second slurry is described. In the column of "First Application Amount", each application amount of the first slurry per unit area of the current collector is described. In the column of "Second Application Amount", each application amount of the second slurry per unit area of the current collector is described.

Properties of the electrodes according to the examples and the comparative examples will be listed below in Tables 3 and 4.

TABLE 3

| | Thickness T (μm) | Length L1 (μm) | Length L2 (μm) | L1/T | Content E1 (atm %) | Content E2 (atm %) | Content E3 (atm %) | Content E4 (atm %) | E1/E2 | Uniformity | Density (g/cm$^3$) | Discharge Capacity Rate | Energy Density (mAh/g) |
|---|---|---|---|---|---|---|---|---|---|---|---|---|---|
| Example 1 | 50.0 | 37.5 | 12.5 | 0.75 | 0.05 | 10.5 | 92 | 78 | 0.0048 | uniformly | 3.0 | 33% | 139.2 |
| Example 2 | 50.0 | 37.5 | 12.5 | 0.75 | 0.06 | 10.0 | 91 | 78 | 0.0060 | uniformly | 3.0 | 30% | 143.6 |
| Example 3 | 50.0 | 37.5 | 12.5 | 0.75 | 0.05 | 10.0 | 92 | 79 | 0.0050 | uniformly | 3.0 | 28% | 152.3 |
| Example 4 | 50.0 | 37.5 | 12.5 | 0.75 | 0.05 | 10.3 | 90 | 80 | 0.0049 | uniformly | 3.0 | 37% | 130.5 |
| Example 5 | 50.0 | 37.5 | 12.5 | 0.75 | 0.05 | 10.0 | 92 | 78 | 0.0050 | uniformly | 3.0 | 40% | 121.8 |
| Example 6 | 57.7 | 43.4 | 14.3 | 0.75 | 0.09 | 11.8 | 86 | 77 | 0.0076 | uniformly | 2.6 | 37% | 87.0 |
| Example 7 | 57.7 | 43.4 | 14.3 | 0.75 | 0.05 | 10.0 | 88 | 79 | 0.0050 | uniformly | 2.6 | 30% | 104.4 |
| Example 8 | 50.0 | 37.5 | 12.5 | 0.75 | 0.05 | 10.2 | 91 | 79 | 0.0049 | uniformly | 3.0 | 35% | 130.5 |
| Example 9 | 53.6 | 40.1 | 13.5 | 0.75 | 0.07 | 12.7 | 89 | 77 | 0.0055 | uniformly | 2.8 | 34% | 113.1 |
| Example 10 | 57.7 | 43.4 | 14.3 | 0.75 | 0.06 | 10.5 | 85 | 75 | 0.0057 | uniformly | 2.6 | 27% | 139.2 |
| Example 11 | 50.0 | 37.5 | 12.5 | 0.75 | 0.05 | 9.0 | 90 | 80 | 0.0056 | uniformly | 3.0 | 34% | 130.5 |
| Example 12 | 50.0 | 37.5 | 12.5 | 0.75 | 0.07 | 11.0 | 88 | 78 | 0.0064 | uniformly | 3.0 | 32% | 139.2 |
| Example 13 | 50.0 | 37.5 | 12.5 | 0.75 | 0.05 | 10.0 | 86 | 74 | 0.0050 | uniformly | 3.0 | 35% | 139.2 |
| Example 14 | 50.0 | 37.5 | 12.5 | 0.75 | 0.06 | 10.0 | 88 | 73 | 0.0060 | uniformly | 3.0 | 36% | 139.2 |
| Example 15 | 50.0 | 37.5 | 12.5 | 0.75 | 0.05 | 10.5 | 90 | 75 | 0.0048 | uniformly | 3.0 | 30% | 139.2 |
| Example 16 | 50.0 | 42.5 | 7.5 | 0.85 | 0.05 | 10.0 | 91 | 79 | 0.0050 | uniformly | 3.0 | 33% | 140.8 |
| Example 17 | 50.0 | 47.5 | 2.5 | 0.95 | 0.05 | 10.0 | 87 | 78 | 0.0050 | uniformly | 3.0 | 32% | 142.4 |
| Comp. Example 1 | 50.0 | 12.5 | 37.5 | 0.25 | 0.06 | 10.0 | 89 | 77 | 0.0060 | uniformly | 3.0 | 24% | 132.8 |
| Comp. Example 2 | 50.0 | 27.5 | 22.5 | 0.55 | 0.05 | 10.0 | 88 | 79 | 0.0050 | uniformly | 3.0 | 25% | 136.0 |
| Comp. Example 3 | 50.0 | 37.5 | 12.5 | 0.75 | 10.8 | 0.06 | 79 | 87 | 180.0 | uniformly | 3.0 | 13% | 132.8 |
| Comp. Example 4 | 57.7 | 43.4 | 14.3 | 0.75 | 11.0 | 0.08 | 76 | 88 | 137.5 | uniformly | 2.6 | 9% | 83.0 |
| Comp. Example 5 | 50.0 | — | — | — | — | — | 90 | 89 | — | uniformly | 3.0 | 5% | 144.0 |
| Comp. Example 6 | 50.0 | — | — | — | — | — | 89 | 89 | — | uniformly | 3.0 | 6% | 144.0 |
| Comp. Example 7 | 50.0 | — | — | — | 2.1 | 15.5 | — | — | 0.1355 | incline | 3.0 | 18% | 135.6 |

TABLE 4

| | Thickness T (μm) | Length L1 (μm) | Length L2 (μm) | L1/T | Content E1 (atm %) | Content E2 (atm %) | Content E3 (atm %) | Content E4 (atm %) | E1/E2 | Uniformity | Density (g/cm$^3$) | Discharge Capacity Rate | Energy Density (mAh/g) |
|---|---|---|---|---|---|---|---|---|---|---|---|---|---|
| Example 18 | 75.0 | 56.2 | 18.8 | 0.75 | 0.06 | 11.1 | 95 | 86 | 0.0054 | uniformly | 2.0 | 30% | 139.2 |
| Example 19 | 75.0 | 56.2 | 18.8 | 0.75 | 0.05 | 10.2 | 94 | 85 | 0.0049 | uniformly | 2.0 | 28% | 174.0 |
| Example 20 | 60.0 | 45.0 | 15 | 0.75 | 0.05 | 10.0 | 94 | 81 | 0.0050 | uniformly | 2.5 | 33% | 208.8 |
| Example 21 | 60.0 | 45.0 | 15 | 0.75 | 0.06 | 10.5 | 94 | 82 | 0.0057 | uniformly | 2.5 | 34% | 208.8 |
| Example 22 | 60.0 | 45.0 | 15 | 0.75 | 0.08 | 10.3 | 93 | 81 | 0.0078 | uniformly | 2.5 | 32% | 208.8 |
| Example 23 | 60.0 | 45.0 | 15 | 0.75 | 0.05 | 10.5 | 95 | 81 | 0.0048 | uniformly | 2.5 | 37% | 208.8 |
| Example 24 | 68.2 | 51.2 | 17 | 0.75 | 0.05 | 9.8 | 93 | 82 | 0.0051 | uniformly | 2.2 | 31% | 69.6 |
| Example 25 | 68.2 | 51.2 | 17 | 0.75 | 0.06 | 10.1 | 94 | 80 | 0.0059 | uniformly | 2.2 | 33% | 104.4 |
| Example 26 | 58.3 | 43.7 | 14.6 | 0.75 | 0.05 | 10.6 | 96 | 86 | 0.0047 | uniformly | 1.2 | 38% | 243.6 |
| Example 27 | 58.3 | 43.7 | 14.6 | 0.75 | 0.05 | 10.4 | 94 | 85 | 0.0048 | uniformly | 1.2 | 31% | 287.1 |
| Example 28 | 75.0 | 56.2 | 18.8 | 0.75 | 0.05 | 11.0 | 94 | 84 | 0.0045 | uniformly | 2.0 | 31% | 139.2 |
| Example 29 | 75.0 | 56.2 | 18.8 | 0.75 | 0.06 | 6.4 | 93 | 85 | 0.0094 | uniformly | 2.0 | 36% | 139.2 |
| Example 30 | 75.0 | 56.2 | 18.8 | 0.75 | 0.05 | 10.1 | 94 | 81 | 0.0050 | uniformly | 2.0 | 39% | 139.2 |
| Example 31 | 75.0 | 56.2 | 18.8 | 0.75 | 0.05 | 7.2 | 95 | 87 | 0.0069 | uniformly | 2.0 | 30% | 139.2 |
| Example 32 | 75.0 | 56.2 | 18.8 | 0.75 | 0.06 | 10.2 | 92 | 84 | 0.0059 | uniformly | 2.0 | 35% | 156.6 |
| Example 33 | 65.2 | 48.9 | 16.3 | 0.75 | 0.06 | 10.0 | 93 | 83 | 0.0060 | uniformly | 2.3 | 39% | 174.0 |
| Example 34 | 71.4 | 53.5 | 17.9 | 0.75 | 0.07 | 9.9 | 94 | 84 | 0.0071 | uniformly | 2.1 | 35% | 121.8 |
| Example 35 | 71.4 | 53.5 | 17.9 | 0.75 | 0.06 | 11.3 | 92 | 85 | 0.0053 | uniformly | 2.1 | 36% | 121.8 |

TABLE 4-continued

| | Thickness T (μm) | Length L1 (μm) | Length L2 (μm) | L1/T | Content E1 (atm %) | Content E2 (atm %) | Content E3 (atm %) | Content E4 (atm %) | E1/E2 | Uniformity | Density (g/cm³) | Discharge Capacity Rate | Energy Density (mAh/g) |
|---|---|---|---|---|---|---|---|---|---|---|---|---|---|
| Example 36 | 75.0 | 63.7 | 11.3 | 0.85 | 0.05 | 10.0 | 96 | 84 | 0.0050 | uniformly | 2.0 | 32% | 140.8 |
| Example 37 | 75.0 | 71.2 | 3.8 | 0.95 | 0.05 | 10.3 | 95 | 83 | 0.0049 | uniformly | 2.0 | 32% | 142.4 |
| Comp. Example 8 | 75.0 | 18.8 | 56.2 | 0.25 | 0.05 | 10.1 | 94 | 84 | 0.0050 | uniformly | 2.0 | 26% | 139.2 |
| Comp. Example 9 | 75.0 | — | — | — | 10.5 | 0.05 | 83 | 94 | 210 | uniformly | 2.0 | 10% | 132.8 |
| Comp. Example 10 | 60.0 | — | — | — | 11 | 0.06 | 82 | 95 | 183 | uniformly | 2.5 | 14% | 199.2 |
| Comp. Example 11 | 75.0 | — | — | — | — | — | 95 | 94 | — | uniformly | 2.0 | 8% | 144.0 |
| Comp. Example 12 | 75 | — | — | — | — | — | — | — | — | uniformly | 2.0 | 7% | 144.0 |
| Comp. Example 13 | 75 | — | — | — | 3 | 14.7 | — | — | 0.2041 | incline | 2.0 | 19% | 135.6 |

In above Tables 3 and 4, each thickness of the active material-containing layer is described in the column of "Thickness T". In the column of "Length L1", each length of the first active material portion along a first direction which is parallel to a thickness direction of the active material-containing layer is described. In the column of "Length L2", each length of the second active material portion along the first direction which is parallel to the thickness direction of the active material-containing layer is described. In the column of "L1/T", each ratio of the length L1 of the first active material portion with respect to the thickness T of the active material-containing layer is described. In the columns of "Content E1" and "Content E2", respective contents of the solid electrolyte particles per unit area in the first active material portion and the second active material portion are described. In the columns of "Content E3" and "Content E4", respective contents of the active material particles per unit area in the first active material portion and the second active material portion are described. In the column of "E1/E2", each ratio between the contents E1 and E2 is described. In the column of "Uniformity", it is described to distinguish whether the solid electrolyte particles were dispersed uniformly or not in the first and second active material portions. In the column of "Density", each density of the active material-containing layer is described. In the column of "Discharge Capacity Rate", each discharge capacity obtained by discharging at the current value of 10 C with respect to each discharge capacity obtained by discharging at the current value of 0.2 C is described. In the column of "Energy Density", each weight energy density of the electrode is described.

The properties of the nonaqueous electrolyte batteries according to the examples and the comparative examples will be listed below in Table 5.

TABLE 5

| | Positive Electrode | Negative Electrode | Discharge Capacity Rate |
|---|---|---|---|
| Example 38 | Example 1 | Example 18 | 40% |
| Example 39 | Example 1 | Comp. Example 12 | 35% |
| Example 40 | Comp. Example 6 | Example 18 | 36% |
| Example 41 | Example 8 | Example 18 | 41% |
| Example 42 | Example 1 | Example 32 | 43% |
| Comp. Example 14 | Comp. Example 6 | Comp. Example 12 | 15% |
| Comp. Example 15 | Comp. Example 3 | Comp. Example 12 | 12% |
| Comp. Example 16 | Comp. Example 6 | Comp. Example 9 | 10% |

As is clear from the comparison between Example 1 and Comparative Examples 1 and 2, the comparison between Example 6 and Comparative Example 4, and the comparison between Example 18 and Comparative Examples 8 and 9, the electrode, of which the length of the first active material portion was 0.7T or more and the content E1/E2 was 0.01 or less, could have the discharge capacity rate and the energy density that were higher than those of the electrodes which did not satisfy any of these requirements. Further, as is clear from the comparison between Example 1 and Comparative Example 3 and the comparison between Example 18 and Comparative Example 10, the electrode, of which the length of the first active material portion was 0.7T or more and the content E1/E2 was 0.01 or less, could have the discharge capacity rate and the energy density that were still higher than those of the electrodes which did not satisfy any of these requirements.

Moreover, as shown in Examples 2 to 11, 19 to 27 and 32 to 35, even if changing the kind of the active material, both of the high discharge capacity rate and the high energy density could be exhibited. Furthermore, as shown in Examples 12 to 15 and 28 to 31, even if changing the kind of the solid electrolyte particles, both of the high discharge capacity rate and the high energy density could be exhibited.

Further, the electrodes according to Comparative Examples 7 and 13 could not exhibit both of the high discharge capacity rate and the high energy density. The reason for this can be considered that, since the solid electrolyte is important to exist on a separator side of the electrode layer in order to improve the rate performances, the electrodes of Comparative Examples 7 and 13, in which the solid electrolyte existed to have a concentration gradient not only on the surface side of the electrode layer but also on a current collector foil side of the electrode layer, exhibited a certain level of improvement of the rate performances, but exhibited the decreased energy density.

The electrode according to at least one of the embodiments described above includes: the second active material portion which contains the solid electrolyte particles; and the first active material portion which contains the solid electrolyte particles by a content less than that in the second active material portion or contains no solid electrolyte particle. Thus, if using this electrode, a secondary battery that is superior in both of the rate performances and the energy density can be realized.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising: a current collector; and an active material-containing layer provided on the current collector, wherein the active material-containing layer includes a first active material portion and a second active material portion that are laminated with each other along a thickness direction and respectively contain active material particles, the first active material portion is positioned between the current collector and the second active material portion, a length of the first active material portion along a first direction is within a range of 0.7T or more and 0.95T or less with respect to a thickness T of the active material-containing layer, the first direction is parallel to the thickness direction, the second active material portion further contains solid electrolyte particles, and a ratio E1/E2 is greater than 0 and 0.01 or less, the ratio E1/E2 representing a ratio of a content E1 of the solid electrolyte particles per unit area in the first active material portion to a content E2 of the solid electrolyte particles per unit area in the second active material portion.

2. The electrode according to claim 1, wherein the active material particles and the solid electrolyte particles are mixed uniformly in the second active material portion.

3. The electrode according to claim 1, wherein the content E1 of the solid electrolyte particles per unit area in the first active material portion is 0.1 atm % or less.

4. The electrode according to claim 1, wherein the content E2 of the solid electrolyte particles per unit area in the second active material portion is 7 atm % or more and 20 atm % or less.

5. The electrode according to claim 1, wherein a content of the active material particles per unit area in the first active material portion is 50 atm % or more and 90 atm % or less.

6. The electrode according to claim 1, wherein a content of the active material particles per unit area in the second active material portion is 30 atm % or more and 85 atm % or less.

7. The electrode according to claim 1, wherein the active material particles contain at least one kind selected from the group consisting of: lithium-manganese composite oxide; lithium-nickel composite oxide; lithium-cobalt composite oxide; lithium-nickel-cobalt composite oxide; lithium-manganese-nickel composite oxide; lithium-manganese cobalt composite oxide; lithium iron phosphate; and lithium-nickel-cobalt-manganese composite oxide.

8. The electrode according to claim 1, wherein the active material particles contain at least one kind selected from the group consisting of: titanium dioxide, titanium composite oxide; niobium-titanium composite oxide; and sodium-containing titanium composite oxide.

9. The electrode according to claim 1, wherein the solid electrolyte particles contain at least one kind selected from the group consisting of: perovskite-type lithium lanthanum titanium-containing oxide; garnet-type lithium lanthanum zirconium-containing oxide; NASICON-type lithium aluminum titanium-containing oxide; and lithium calcium zirconium-containing oxide.

10. A secondary battery comprising a negative electrode, a positive electrode, and an electrolyte, at least one of the negative electrode and the positive electrode comprising the electrode according to claim 1.

11. A battery pack comprising the secondary battery according to claim 10.

12. The battery pack according to claim 11, further comprising an external power distribution terminal and a protective circuit.

13. The battery pack according to claim 11, which includes plural of the secondary battery and the plural of the secondary battery are electrically connected in series, in parallel, or in combination of series and parallel.

14. A vehicle comprising the battery pack according to claim 11.

15. The vehicle according to claim 14, which comprises a mechanism configured to convert kinetic energy of the vehicle into regenerative energy.

16. The electrode according to claim 1, wherein the ratio E1/E2 is 0.0094 or less.

17. The electrode according to claim 1, wherein the ratio E1/E2 is 0.0045 or more.

18. The secondary battery according to claim 10, wherein the negative electrode is the electrode according to claim 1.

19. The electrode according to claim 1, wherein in the second active material portion, the solid electrolyte particles are mixed uniformly.

20. The electrode according to claim 1, wherein the first active material portion further contains solid electrolyte particles, and in the first active material portion, the solid electrolyte particles are mixed uniformly.

* * * * *